(12) United States Patent
Esswie

(10) Patent No.: US 12,432,714 B2
(45) Date of Patent: Sep. 30, 2025

(54) DYNAMIC SCHEDULING OF PAIRED DOWNLINK AND UPLINK TRAFFIC

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 18/069,113

(22) Filed: Dec. 20, 2022

(65) Prior Publication Data
US 2024/0205913 A1 Jun. 20, 2024

(51) Int. Cl.
*H04W 72/1263* (2023.01)
*H04W 28/02* (2009.01)
*H04W 72/543* (2023.01)

(52) U.S. Cl.
CPC ... *H04W 72/1263* (2013.01); *H04W 28/0278* (2013.01); *H04W 72/543* (2023.01)

(58) Field of Classification Search
CPC ........... H04W 72/1263; H04W 72/543; H04W 28/0278
See application file for complete search history.

(56) References Cited

U.S. PATENT DOCUMENTS

| | | | | |
|---|---|---|---|---|
| 2019/0363843 A1* | 11/2019 | Gordaychik | ........ | H04W 72/044 |
| 2022/0294597 A1* | 9/2022 | Ibrahim | .................... | H04L 5/14 |
| 2023/0050681 A1* | 2/2023 | Zhou | ..................... | H04W 72/20 |
| 2023/0120774 A1* | 4/2023 | Xue | .................. | H04W 72/1263 370/336 |
| 2024/0137294 A1* | 4/2024 | Choi | ................... | H04L 41/0806 |

(Continued)

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Ajay Cattungal
(74) *Attorney, Agent, or Firm* — Amin, Turocy & Watson, LLP

(57) ABSTRACT

A user equipment transmits, to a RAN node, application-specific information that may comprise quality of service class identifiers associated with traffic flows corresponding to the application. Responsive to the application-specific information, the user equipment receives, from the node, configuration information corresponding to an application-specific downlink search space, which may be monitored or decoded using the configuration information by the user equipment to determine a joint downlink-uplink configuration. The joint downlink-uplink configuration may indicate downlink resources to use for receiving application-flow-specific downlink traffic and the joint downlink-uplink configuration may indicate uplink resources to be used to transmit application-flow-specific uplink traffic that is linked to, or corresponds to, the application-flow-specific downlink traffic. The user equipment may be configured to transmit an estimated buffer status report indicating estimated uplink traffic to be transmitted corresponding to application-flow-specific downlink traffic.

20 Claims, 14 Drawing Sheets

(56) References Cited

U.S. PATENT DOCUMENTS

2024/0205913 A1* 6/2024 Esswie .............. H04W 72/1263

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
Invitation to Pay Additional Fees for PCT Application No. PCT/US2023/035952 mailed Feb. 12, 2024, 17 pages.
"3rd Generation Partnership Project; Technical Specification Group Radio Access Network; NR; NR and NG-RAN Overall. Description; Stage 2 (Release 17)", 3GPP Standard; Technical Specification; 3GPP TS 38.300, Sep. 29, 2022, [https://ftp.3gpp.org/Specs/archive/38_series/38.300/38300-h20.zip 38300-h20.docx] 210 pages.
ITRI: "Discussion on the UL enhancement for XR", 3GPP Draft; R2-2207173, RAN WG2, No. electronic; Aug. 10, 2022, [https://ftp.3gpp.org/tsg_ran/WG2_RL2/T SGR2_119-e/Docs/R2-2207173.zip R2-2207173_Discussion on the UL enhancement for XR.doc], 4 pages.
AT&T: "Support for XR-specific scheduler enhancements", 3GPP Draft; R2-2209698, RAN WG2, No. electronic; Sep. 30, 2022, [https://ftp.3gpp.org/• sg_ran/WG2_RL2/T SGR2_119bis-e/Docs/R2-2209698.zip R2-2209698.docx], 4 pages.
International Search Report and Written Opinion for PCT Application No. PCT/US2023/035952 mailed Apr. 8, 2024, 22 pages.
International Search Report and Written Opinion for PCT Application No. PCT/US2023/035952 mailed Jun. 17, 2024, 25 pages.
European Office Action mailed Jul. 29, 2025 for European Patent Application No. 23813123.9, 3 pages.
Transmittal of International Preliminary Report on Patentability mailed Jul. 3, 2025 for PCT Application No. PCT/US2023/035952, 17 pages.

\* cited by examiner

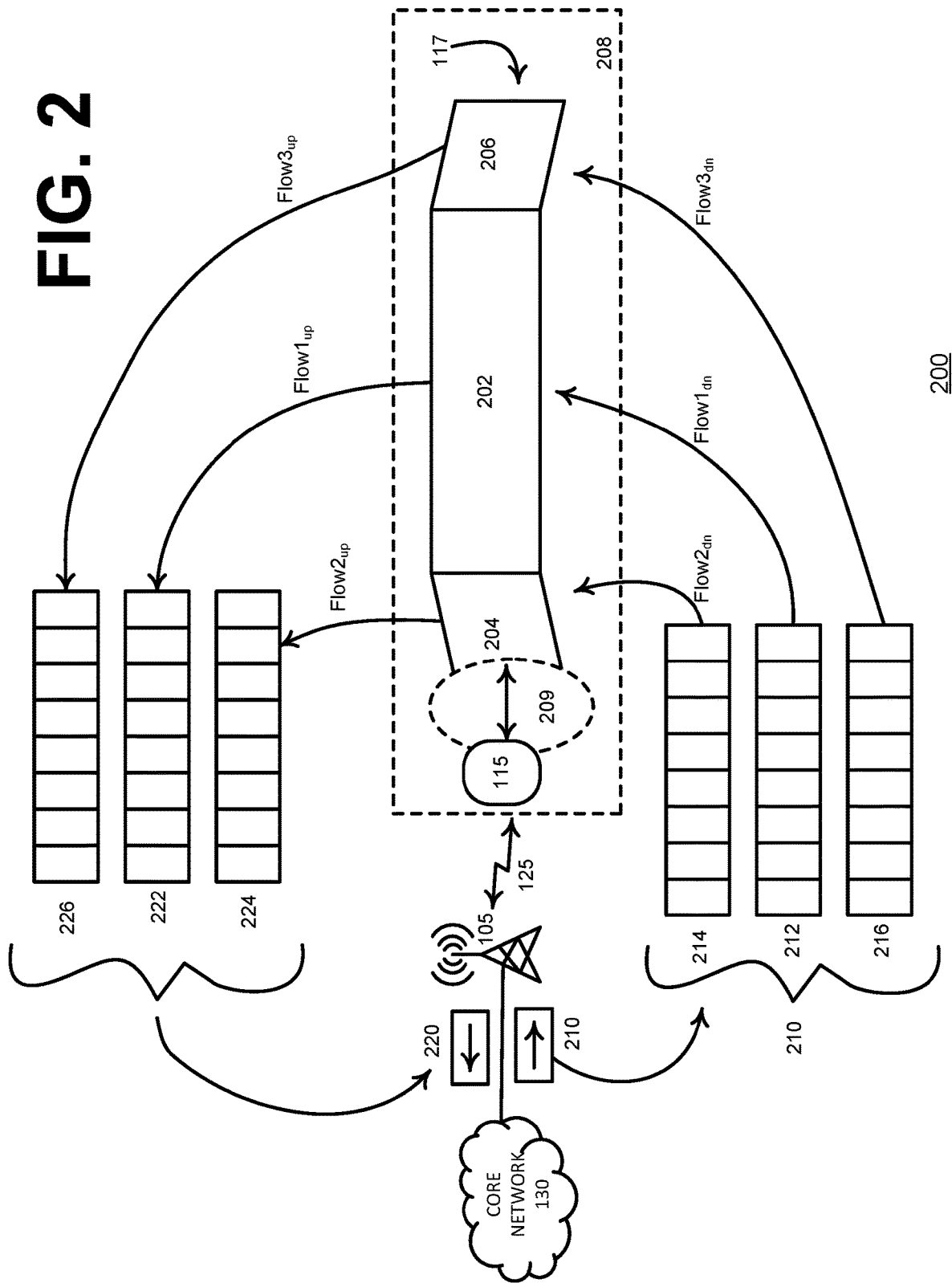

304 ─→

| XR-specific DCI contents |
|---|
| - Downlink scheduling information of downlink traffic. [time resource indications, frequency resource indication, start time of the resource allocation]
- Downlink transmission modulation and coding scheme (MCS) indications.
⋮
- Uplink future/delayed scheduling information of uplink traffic. [time resource indications, frequency resource indication, start time of the resource allocation]
- Uplink MCS indication |

FIG. 4D

DYNAMIC SCHEDULING OF PAIRED DOWNLINK AND UPLINK TRAFFIC

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultra-reliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises transmitting, by a user equipment comprising a processor to a radio access network node, an application-type indication message indicative of application information corresponding to an application configured for use by the user equipment. The application-type indication message may be transmitted as an uplink control channel information message. The application information may comprise an application latency criterion indication indicative of an acceptable delay, corresponding to the traffic flow, between receiving of a future downlink data traffic portion and transmitting of an uplink control indication indicative of uplink traffic, corresponding to the future downlink data traffic portion, to be transmitted by the user equipment to the radio access network node. The method may further comprise receiving, by the user equipment from the radio access network node, responsive to the application-type indication message, a joint downlink-uplink scheduling configuration to be used by the user equipment to manage at least one traffic flow corresponding to the application. The joint downlink-uplink scheduling configuration may be transmitted as a downlink control information message. The joint downlink-uplink scheduling configuration may be retrieved by monitoring and decoding an application-specific search space indicated in a configuration that may be received responsive to the responsive to the application-type indication message. Thus, there may be one or more intervening acts pertaining to receiving the application-specific search space configuration and decoding the application specific search space between the transmitting of the application-type indication message and the receiving of the joint downlink-uplink scheduling configuration.

The example embodiment method may further comprise receiving a downlink data traffic portion, comprising a downlink data traffic portion traffic amount, of a traffic flow corresponding to the application. The example embodiment method may further comprise, according to the joint downlink-uplink scheduling configuration, generating, by the user equipment, an expected buffer status report based on the downlink data traffic portion traffic amount. The example embodiment method may further comprise, according to the joint downlink-uplink scheduling configuration, transmitting, by the user equipment to the radio access network node, the expected buffer status report.

The application information may comprise an application target quality-of-service metric to be used by the radio access network node to assign an application service class to the traffic flow. The joint downlink-uplink scheduling configuration may comprise at least one traffic flow identifier corresponding to the at least one traffic flow. The user equipment may use a traffic flow identifier in the joint downlink-uplink scheduling configuration to determine whether to use resources indicated in the joint downlink-uplink scheduling configuration for managing downlink or uplink traffic.

In an embodiment, the application-type indication message comprises an expected buffer status size corresponding to an expected uplink data traffic portion expected to be transmitted by the user equipment to the radio access network node following receiving of a future downlink data traffic portion directed to the application.

In an embodiment, the application-type indication message may be configured to be transmitted by the user equipment upon a configured latency criterion being satisfied.

In an embodiment, the expected buffer status report may be transmitted before uplink data traffic to be transmitted, corresponding to the downlink data traffic portion, is in a buffer of the user equipment.

The example embodiment method may further comprise, according to the joint downlink-uplink scheduling configuration, transmitting, by the user equipment to the radio access network node, an uplink data traffic portion corresponding to the downlink data traffic portion.

The example embodiment method may further comprise, receiving, by the user equipment, an application-specific downlink search space indication that may be indicative of an application-specific downlink search space to be used by the user equipment to manage traffic corresponding to the application. In an embodiment, the application-specific downlink search space may be indicative of an application-specific downlink search space to be used by the user equipment to retrieve, or obtain, the joint downlink-uplink scheduling configuration.

In an embodiment, the application-specific downlink search space indication may be configured, by the radio access network node, to comprise at least one of: a downlink traffic scheduling indication indicative of a downlink search space to be used to receive downlink data traffic corresponding to the traffic flow, a downlink modulation and coding scheme indication indicative of a modulation and coding scheme to be used to receive downlink traffic corresponding of the traffic flow, an uplink traffic scheduling indication indicative of an uplink resource to be used to transmit uplink traffic corresponding to received downlink data traffic of the traffic flow, or an uplink modulation and coding scheme indication indicative of a modulation and coding scheme to be used to transmit uplink traffic corresponding to received downlink data traffic of the traffic flow.

The example embodiment method may further comprise decoding, by the user equipment, from the application-specific downlink search space the downlink data traffic portion corresponding to the traffic flow according to at least one of the downlink traffic scheduling indication or the downlink modulation and coding scheme indication, and transmitting uplink traffic corresponding to the downlink data traffic portion according to at least one of the uplink traffic scheduling indication or the uplink modulation and coding scheme indication.

In another embodiment, a user equipment may comprise a processor configured to: execute an application, transmit, to a radio access network node, an application indication message indicative of the application, and receive, from the radio access network node, responsive to the application indication message, an application-specific search space configuration. The processor may be further configured to receive, according to the application-specific search space configuration, a joint downlink-uplink scheduling configuration to be used by the user equipment to manage traffic of a first traffic flow corresponding to the application. The processor may be further configured to receive first downlink data traffic of the first traffic flow according to a first downlink resource indicated by the joint downlink-uplink scheduling configuration. The processor may be further configured to generate first uplink traffic corresponding to the first traffic flow. The processor may be further configured to transmit, to the radio access network node, the first uplink traffic according to a first uplink resource indicated by the joint downlink-uplink scheduling configuration. Thus, a single, joint downlink-uplink scheduling configuration may comprise downlink and uplink resources that can be used to not only receive a downlink traffic portion, but also to transmit an uplink traffic portion that may be linked to the downlink traffic portion.

In an embodiment, the first uplink traffic may comprise first buffer status information indicative of estimated future uplink traffic corresponding to the first downlink data traffic, and wherein the first buffer status information is transmitted as an estimated buffer status report before uplink data traffic corresponding to the first downlink data traffic has been generated by the user equipment. In an embodiment, the first uplink traffic may comprise uplink data traffic corresponding to the first downlink data traffic.

The processor of the user equipment may be further configured to receive, from the radio access network node, responsive to the application indication message, a downlink scheduling indication indicative of a second downlink resource to be used by the user equipment to receive second downlink data traffic of a second traffic flow corresponding to the application. The second traffic flow may not have as high of a latency requirement, for example, than the first traffic flow. The processor of the user equipment may be further configured to receive, from the radio access network node, second downlink data traffic of the second traffic flow according to the second downlink resource and receive, from the radio access network node, a second uplink resource indication indicative of a second uplink resource to be used to transmit a buffer status report indicative of uplink traffic to be generated corresponding to the second downlink data traffic. Instead of generating an expected buffer status report, the processor of the user equipment may be further configured to generate second uplink data traffic corresponding to the second downlink data traffic and then generate second buffer status information indicative of the second uplink data traffic. After generating the second uplink traffic and corresponding uplink buffer status report information, the processor the user equipment may be further configured to transmit, to the radio access network node, a second buffer status report, comprising the second buffer status information, after the second downlink data traffic has been generated. The first traffic flow may have, or be associated with, a first quality of service requirement, the second traffic flow may have, or be associated with, a second quality of service requirement, and the first quality of service requirement may be higher than the second quality of service requirement. For example, the first traffic flow may correspond to a pose portion of a smart glass appliance and the second traffic flow may correspond to a peripheral portion of the smart glass appliance, and the first traffic flow may therefore be associated with a more stringent latency requirement than the second traffic flow.

In yet another embodiment, a non-transitory machine-readable medium, may comprise executable instructions that, when executed by a processor of a user equipment, facilitate performance of operations, that may comprise: determining an application flow information metric, corresponding to a traffic flow of an application being executed by the processor, to result a determined application flow information metric (e.g., a measured or determined latency of the traffic flow. The operations may further comprise analyzing the determined application flow information metric with respect to an application flow metric criterion, such as a latency threshold, corresponding to the application flow information metric, to result in an analyzed application flow information metric. Based on the analyzed application flow information metric failing to satisfy the application flow metric criterion (e.g., the measured or determined latency is higher than the latency threshold), the operations may further comprise transmitting, to a radio access network node, an application flow performance indication message indicative of the analyzed application flow information metric failing to satisfy the application flow metric criterion. The operations may further comprise receiving, from the radio access network node, responsive to the application flow performance indication message, a joint downlink-uplink scheduling configuration to be used by the user equipment to manage the traffic flow and receiving a downlink data traffic portion of the traffic flow. The operations may further comprise determining determine uplink traffic to transmit to the radio access network node based on the receiving of the downlink traffic portion. The determining of determined uplink traffic may comprise determining an estimated buffer status report, based on the downlink data traffic portion, comprising an estimated size of an estimated uplink data traffic portion of the traffic flow to be transmitted by the user equipment. The determining of determined uplink traffic may comprise determining and uplink traffic portion that may comprise uplink data traffic linked to the downlink traffic portion. In an embodiment, the operations may further comprise transmitting to the radio access network node, the estimated buffer status report, according to the joint downlink-uplink scheduling configuration. In another embodiment, the operations may further comprise transmitting, to the radio access network node, the uplink traffic portion that may comprise uplink data traffic linked to the downlink traffic portion according to the joint downlink-uplink scheduling configuration.

In an embodiment, the estimated buffer status report may be transmitted before an uplink data traffic portion to be transmitted, corresponding to the downlink data traffic portion, is in a buffer to which the estimated buffer status report corresponds. In an embodiment, the determined application flow information metric is a latency corresponding to the traffic flow.

BRIEF DESCRIPTION OF THE DRAWINGS

FIG. 2 illustrates an example virtual reality appliance in a wireless network environment.

FIG. 4D illustrates example contents of a joint downlink-uplink scheduling configuration.

DETAILED DESCRIPTION OF THE DRAWINGS

Figure 1:
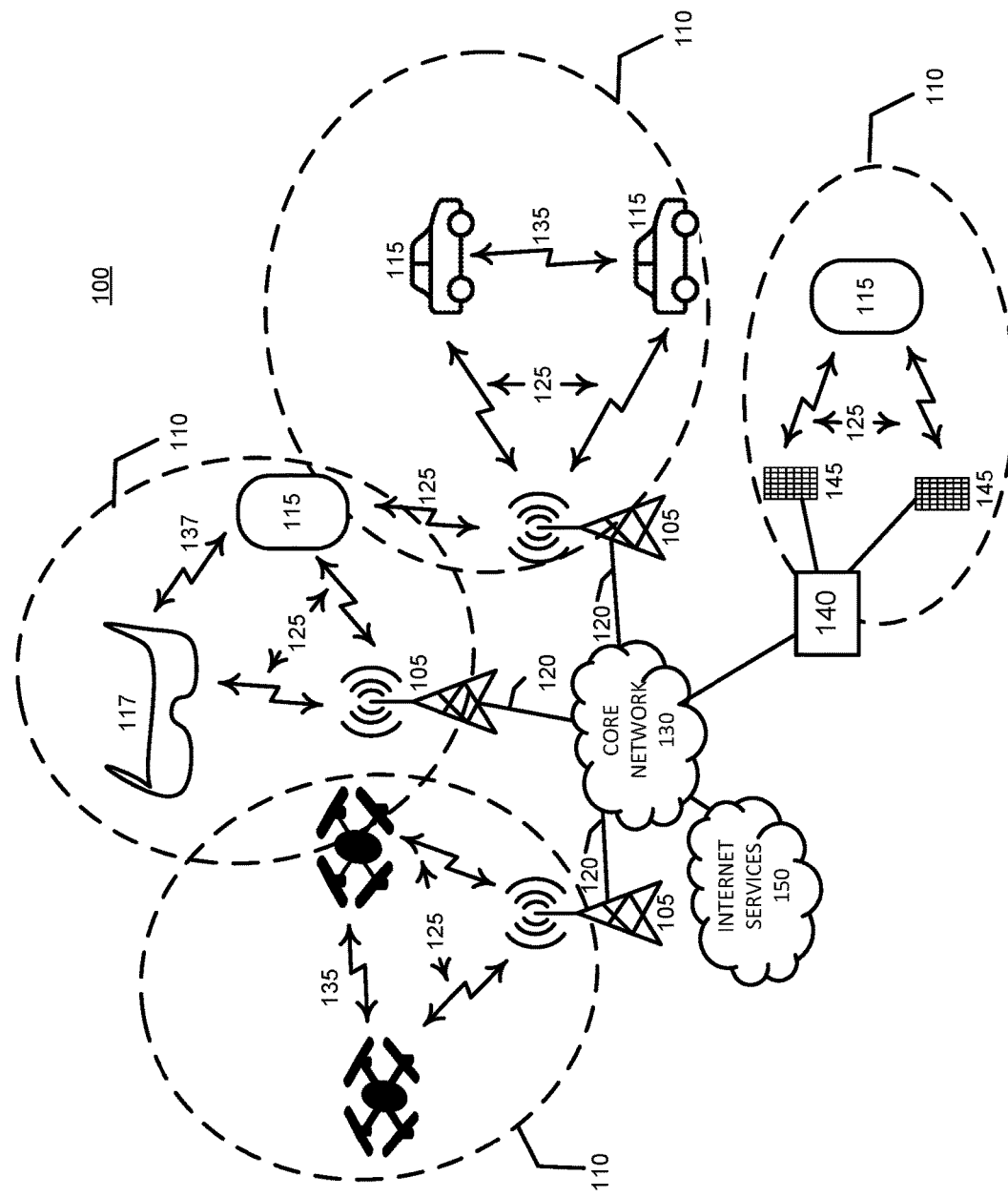
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC $10e$-$5$ reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels. This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that are relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to 5 Mbps URLLC link with a 1 ms radio budget, some XR applications need 100 Mbps links with a couple of milliseconds of the allowed radio latency. Thus, 5G radio design and associated procedures may be adapt to the new XR QoS class and associated targets.

XR service may be facilitated by traffic having certain characteristics associated with the XR service. For example, XR traffic may typically be periodic with time-varying packet size and packet arrival rate. In addition, different packet traffic flows of a single XR session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Hybrid automatic repeat request (HARQ) may be used for packet retransmission and packet combining in case of a failed decoding of a packet's first transmission, and typically enhances radio reliability between a RAN and a user equipment. User equipment devices may send HARQ ACK/NACK feedback reports towards a serving cell RAN indicating a successful or failed downlink packet reception and decoding, and the RAN typically prioritizes retransmission of packets for which decoding failed over transmission of newly-arriving packets. However, for critical use cases, such as VR, not all traffic may be equally important or have an equal impact on a user's quality of experience. Accordingly, not all packet HARQ retransmissions should be equally prioritized over transmission of newly-arriving packet transmission. For example, for a smart glass which is streaming a broadband video, it is desirable for the smart glass device to rapidly receive packet retransmissions, particularly for packets that correspond to the pose, or front, viewing coverage while latency targets can be relaxed for packets contributing to the peripheral sides of the viewing coverage of the smart glass device, since jitter associated with packets contributing to peripheral views may not impose dizziness or fuzziness. Instead of prioritizing HARQ packet retransmissions over new packet transmissions, regardless importance or latency tolerance of packets (new or already transmitted), for critical and capacity-demanding services, which may be negatively impacted by latency associated with the new packet arrivals due to the retransmission of non-important packets, a latency-aware HARQ packet retransmission procedure is disclosed, such that HARQ packet retransmissions are handled and dynamically prioritized based on their respective importance and scheduling latency allowance, derived from the application point of view (e.g., from the perspective of a VR application operating a smart glass). Using latency-aware retransmission indications avoids a scheduler of a RAN node in prioritizing many non-critical packet retransmissions at the expense of transmission of more critical new packet arrivals. The RAN scheduler may be made aware of the priority of a packet based on a latency-aware retransmission request indication received from a user equipment that corresponds to a latency tolerance or importance of the HARQ packet retransmissions. Accordingly, the RAN may schedule new and retransmission of packets based on their respective, and potentially differing, latency requirements as determined by the user equipment, or by an application running on the user equipment.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2. Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs. or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz. (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 10 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (U-IF) region or decimeter band because the wavelengths range from approximately one decimeter to one meter in length. The UI-IF waves may be blocked or redirected by buildings and environmental features, but the waves may penetrate structures sufficiently for a macro cell to provide service to LJEs 115 located indoors. The transmission of UI-IF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a LE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

FIG. 2 illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases, different applications, or even different traffic flows directed to the same application at a user equipment may require different QoS and different respective corresponding radio performance. Typically, for XR use cases, but unlike for URLLC or eMBB use cases, high-capacity radio links that carry XR data traffic (e.g., data flows that comprise visual information) with stringent radio performance levels (e.g., latency) and reliability levels are required for a reasonable end user experience. For example, compared to 5 Mbps URLLC link with a 1 ms radio latency budget, some XR applications require 100 Mbps links with about 2 ms allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; and (3) multiple data packet flows corresponding to different visual information of a given XR session are not perceived by a user as having the same impact on the end user experience.

Thus, in addition to needing XR-specific power use efficiency, a smart glass device, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry more important traffic, may be used to optimize overall capacity and performance of a wireless communication system, such as a 5-G communication system using NR techniques, method, systems, or devices. For example, a first wireless downlink data traffic flow 212 carrying visual information for display on center, or pose, visual display portion 202 may be prioritized higher than a wireless downlink data traffic flow 214 carrying visual information for left visual display portion 204 or a third wireless downlink traffic flow 216 carrying traffic for right visual display portion 206.

The performance of a communication network in providing XR services may be at least partially determined according to satisfaction of users of the XR services. Each XR-service-using user may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices, such as UE 115. The 5G control channel may facilitate operation according to requirements of URLLC and eMBB use cases and may facilitate an efficient coexistence between different QoS classes for different traffic flows.

Traffic 210 directed to UE 115 for an XR session at appliance 117 may arrive at RAN 105 from core network 130 via wireless link 125. It will be appreciated that UE 115 and appliance 117 may be different devices, or components that compose, or make up, device 208, or UE 115 and appliance 117 may be combined into a device 208, such as an XR appliance that comprises components that facilitate wireless communication with RAN 105. For purposes of discussion, UE 115 and appliance 117 may be referred to as separate devices. UE 115, or a processor thereof, may implement, run, or otherwise execute XR application 209. Downlink traffic 210 may be buffered at RAN 105. Uplink traffic 220, comprising uplink traffic 222, 224, and 226, may correspond to downlink traffic 212, 214, and 216. For example, a user of appliance 117 may receive downlink traffic 212 directed to pose section 202, and the appliance may generate uplink traffic 222 that may indicate changes of a view, a perceived view, an estimated view, or an artificially created view, that a user of appliance 117 may have while moving the appliance as the user moves. A first traffic flow may comprise first downlink traffic flow 212, which may be linked with, or correspond to, first uplink traffic flow 222. Similarly, a second traffic flow may comprise second downlink traffic flow 214, which may be linked with, or correspond to, second uplink traffic flow 224, and a third traffic flow may comprise third downlink traffic flow 216, which may be linked with, or correspond to, third uplink traffic flow 226. In FIG. 2, the first traffic flow is referred to as Flow1, the second traffic flow is referred to as Flow2, and the third traffic flow is referred to as Flow3. It will be appreciated that reference to a first flow, a second flow, or a third flow may be different elsewhere herein. It will be appreciated that downlink traffic 210 may be generated by, and uplink traffic 220 may be directed to, a different user equipment than user equipment 115, which other user equipment may be served by core network 130, and that may, or may not be, served by RAN 105. It will also be appreciated that downlink traffic 210 may be generated by, and uplink traffic 220 may be directed to, user equipment 115.

Desirable characteristics of systems that facilitate XR applications include extreme bandwidth capacity and ultra-tight latency budgets simultaneously for concurrent, linked, or joint, uplink (UL) and downlink (DL) transmissions. However, existing, conventional scheduling schemes and corresponding control channel signaling procedures are optimized for independent scheduling of resources for uplink and downlink traffic. Due to the nature of XR traffic, where an uplink traffic flow may be (and typically is) paired with previously received downlink traffic flow, joint uplink and downlink scheduler and control channel enhancements are desired. For example, upon receiving a downlink XR video stream directed to an AR application (e.g., for a smart glass viewing), a user equipment facilitating the smart glass may need to transmit, in the uplink direction, updated pose information. Otherwise, a subsequent downlink stream may be delayed and thus 'freeze' the augmented streaming and negatively impact the experience of the user using the smart glass. Timing of UL traffic availability and respective traffic size are not known a priori at a RAN node. Accordingly, under existing procedures, user equipment devices transmit an uplink scheduling request ("SR"), indicating uplink traffic availability (e.g., uplink traffic already in a buffer of the user equipment ready to be transmitted in an uplink direction to the RAN), then, transmit a buffer status report ("BSR") indicating how much uplink traffic is available, and finally, receive a scheduled uplink resource allocation from the RAN node. Following such a conventional procedure often leads to violating a critical target latency budget, requirement, or criterion corresponding to a traffic flow.

XR services are characterized by simultaneous download and uplink transmission where both may require extreme capacity and an ultra-low latency budget. Furthermore, different XR applications may exhibit different jitter levels of packet arrivals due to video codecs adopted for use in processing XR frame composition. Codec selection/adoption may dynamically depend on the XR application itself, channel conditions, interferences conditions, and the like, and thus codec selection may vary in time, and thus induce jitter of packet arrival. Moreover, a majority of XR services require paired, linked, or joint downlink and uplink traffic flows. For example, augmenting a user's surrounding environment through an AR smart glass may require that the smart glass quickly send uplink traffic corresponding to a pose direction, or portion, of the smart glass and sensed environment information while receiving the augmented, or virtualized, part of the XR flow. Thus, XR applications benefit from efficient, joint-uplink/downlink-capable downlink/uplink schedulers, where schedulers that pair downlink and uplink traffic and respective control channels may be optimized for joint XR traffic.

However, existing/conventional scheduling procedures and control channel signaling are optimized for either downlink or uplink traffic. Thus, for example, in case of uplink XR traffic available for transmission from a user equipment, using conventional techniques the user equipment needs to first transmit a scheduling request, indicating the uplink traffic, and transmit in a later uplink data transmission, a buffer status report, indicating how much uplink traffic is in a buffer of the user equipment. The RAN node schedules an appropriate size of uplink resources to accommodate the uplink traffic buffered at the user equipment as indicated in the buffer status report, and the user equipment finally receive from the RAN uplink resource grant. This conventional procedure may (typically) induce latency that violates a latency budget of the uplink XR traffic, which latency in many cases may lead to user dizziness due to, for example, repeated partial streaming freezes. Semi persistent scheduling and configured grant scheduling may facilitate a RAN in scheduling uplink resources for potentially incoming uplink XR traffic from a given device. However, due to the lack of actual reporting of traffic availability time and size, such advance allocations may be insufficient, (e.g., either resources are overallocated, leading to a resource waste, or underallocated, leading to extended packet buffering time. A lack of awareness of XR application operation by a user equipment, and lack of awareness of related XR traffic characteristics, may cause existing scheduling procedures and associated control channel designs to be capacity and latency non-friendly, thus often resulting in violation of the paired downlink and uplink capacity and latency targets for critical XR traffic, such as traffic corresponding to a pose portion of a smart glass appliance. Thus, efficient joint scheduling of critical downlink and uplink XR traffic is desirable.

Accordingly, joint uplink and downlink scheduling scheme embodiments, and optimized control channel embodiments are disclosed herein. As disclosed herein, XR application awareness information may be considered to facilitate joint downlink and uplink traffic scheduling. Embodiments disclosed herein facilitate user equipment devices in proactively announcing respective XR-application-specific traffic characteristics such that a serving RAN node can efficiently and jointly schedule downlink and uplink resources without exhibiting, or with minimal, delay for SR and BSR exchanges, thus reducing overall, end-to-end, radio latency.

With embodiments disclosed herein, joint scheduling of critical downlink and uplink traffic may use application-specific (e.g., XR application/service) information to dynamically and efficiently schedule allocation of paired downlink and uplink resources. For example, a user equipment may indicate to a serving RAN XR capability information in terms of a target quality of service criterion such that the RAN can efficiently associate traffic corresponding to the user equipment to an appropriate service class, or classes. In an embodiment, a serving RAN may configure user equipment devices to use joint downlink and uplink scheduling for certain XR traffic flows indicated by the user equipment, the flows being represented by associated flow identifiers. Because not all XR flows are equally important, and thus should be treated in proportion to impact on end user experience their respective degradation may cause, identifying flows facilitates a user equipment in using techniques disclosed herein for the critical/more important traffic flows. Therefore, during an active XR session, a user equipment running an XR application may compile an uplink control channel information message which may comprise XR-application-specific information that may comprise quality of service indications corresponding to flows that are supporting an XR application. The user equipment may transmit an application-specific acceptable delay between a successfully received downlink flow and corresponding, paired, uplink control update corresponding to an uplink flow corresponding to the downlink flow. The user equipment may compile an expected buffer status size to be transmitted in the uplink direction following a received downlink traffic flow. A user equipment may indicate parameter metrics (e.g., estimated/predicted buffer status amount and latency criterion) in terms of quantized indications. The parameter metrics may be reported only when they satisfy parameter criterion/criteria, such as, for example, a configured buffer size threshold or a latency threshold, to reduce the control signaling overhead if latency, for example, is not negatively impacting a user's XR experience. Based on those application-specific parameter metrics, the serving RAN transmits a downlink control information including joint downlink resource scheduling information to use for receiving current downlink traffic and uplink resource scheduling information to use to transmit expected uplink transmission following the downlink traffic.

Unlike existing control channel design, where either a downlink or an uplink resource allocation is configured per downlink control information transmission, in embodiments disclosed herein, control channel information facilitates joint downlink and uplink channel resource allocation in one message (i.e., in 'one shot'). Accordingly, from the perspective of a user equipment device, the user equipment may be configured and enabled to receive critical XR downlink traffic, and right after, without additional scheduling delays, being already-allocated an uplink resource, or resources, to use for uplink traffic corresponding to a critical flow, for example a pose portion of a smart glass appliance. From the perspective of the scheduling RAN, resources for downlink and uplink are efficiently and rapidly scheduled based on each user equipment's application (e.g., and XR application) equipment (e.g., latency, resource size) without extra scheduling delays or additional control channel resource waste.

Reporting of expected buffer size, for a specific application traffic.

Conventional buffer status reporting is based on actual traffic in an uplink buffer of a user equipment. As described above, this results in delay because the uplink traffic is already available in the buffer before a corresponding buffer status report is transmitted to a serving RAN. In an embodiment disclosed herein, advantage may be taken of the fact that XR traffic (or traffic of other types of application that may manage paired uplink and downlink traffic) often uses paired downlink and uplink traffic. Thus, an XR application executing on a user equipment can estimate how much, or when, uplink traffic, for example for a pose-related traffic flow an orientation-update-related traffic flow, is available after receiving a corresponding downlink transport block or flow of the pose-related, or orientation-update-related traffic flow. Accordingly, embodiments disclosed herein may proactively schedule uplink resources for traffic that is yet to come, or yet to be generated, and thus reduce, if not eliminate, buffering delays.

Figure 3A:
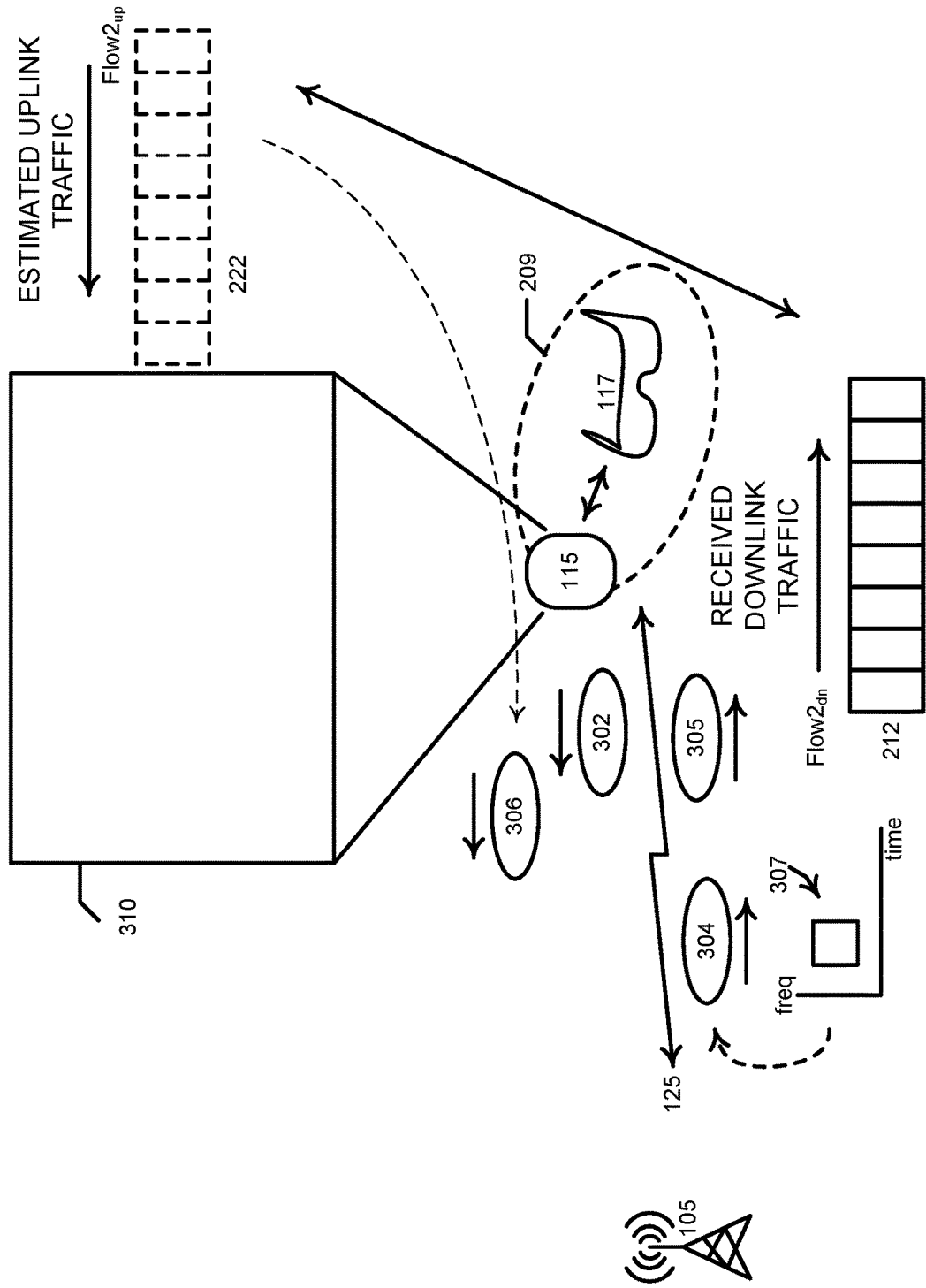
FIG. 3A illustrates an example user equipment managing uplink traffic that corresponds to downlink traffic for a high QoS traffic flow.

Turning now to FIG. 3A, the figure illustrates an example environment 300 with user equipment 115 managing uplink traffic that corresponds to downlink traffic. User equipment 115 may indicate to RAN 105 that the user equipment is operating, facilitating, or otherwise executing application 209, which may be an anything-reality application. User equipment 115 may indicate to RAN 105 that the user equipment is executing application 209, which may be in conjunction with facilitating use of appliance 117. User equipment 115 may make such an indication via an application-type indication message 302 that may be indicative of application information corresponding to application 209 being configured for use by the user equipment to facilitate operation of appliance 117. In an embodiment, application-type indication message 302 may be referred to as an application indication message. In an embodiment, user equipment 115 may determine whether an application flow information metric has satisfied an application flow metric criterion, and may transmit to RAN 105 message 302, which may be referred to as an application flow performance indication message, indicating to the RAN that the application flow metric criterion was not satisfied. For example, if a portion of Flow1, as shown in FIG. 2, corresponding to pose portion 202 of appliance 117, in the uplink direction or downlink direction, experienced latency more than a configured latency criterion corresponding to the Flow1, before portion 212 was transmitted from RAN 105 to user equipment 115, user equipment 115 may transmit the application flow performance indication message 302, as shown in FIG. 3A.

Regardless of whether or not user equipment 115 transmitted message 302 to RAN 105 due to an application flow information metric not satisfying an application flow metric criterion, responsive to message 302, the RAN may transmit application-specific search space message 305 that may indicate an application specific search space 307 for user equipment to use for determining a configuration 304. Configuration 304 may be referred to as a joint downlink-uplink scheduling configuration, which may be used by user equipment 115 to manage at least one traffic flow corresponding to application 209. Configuration 304 may configure user equipment 115 to estimate uplink traffic, which may correspond to pose portion 202 of appliance 117 as shown in FIG. 2, after the user equipment has received downlink traffic portion 212, that may also correspond to the pose portion of the appliance. Configuration 304 may be obtained by user equipment 115 by decoding application-specific search space 307 indicated in message 305 that RAN 105 may transmit to the user equipment in response to message 302. As described in reference to the embodiment depicted in FIG. 2, downlink traffic portion 212 and uplink traffic portion 222 may be linked to one another and may be referred to as joint portions of the first traffic flow. Accordingly, before user equipment 115 generates uplink traffic portion 222 of Flow1 and stores uplink traffic portion 222 to buffer 310 for transmission to RAN 105, the user equipment may generate an estimated buffer status report 306 corresponding to expected traffic portion 222 of Flow2, or an expected size of traffic portion 222, and transmit the estimated buffer status report to RAN 105. (Uplink traffic portion 222 is shown in broken lines in FIG. 3A to indicate that the traffic portion has not yet been generated or has not yet been buffered, or stored, in buffer 310.) Estimated buffer status report 306 may be transmitted from UE 115 to RAN 105 via a resource scheduled via configuration 304.

Thus, according to configuration 304, the estimated buffer status report 306 may comprise an estimated, or expected, size, or amount, of uplink traffic portion 222 of Flow1 that the user equipment has not generated yet. An estimation amount that estimated buffer status report 306 may comprise may be based on an amount of traffic of downlink traffic flow portion 212, or an estimation amount may be based on previous sizes, or amounts, of uplink traffic transmitted by the user equipment in response to corresponding downlink traffic of Flow1. By transmitting estimated buffer status report 306 before traffic portion 222 has been generated or buffered in buffer 310, RAN 105 may schedule, and transmit to user equipment 115, uplink resources for the user equipment to use to transmit uplink traffic portion 222 without having to wait for said uplink traffic portion to be generated and stored in buffer 310, thus reducing overall latency of traffic of Flow1.

It will be appreciated that configuration information contained in configuration 304 may be based on application information, and flow information and corresponding flow identifiers corresponding to application 209, that was transmitted in message 302. Thus, configuration 304 may comprise configuration information that indicates to user equipment 115 to estimate buffer status information, for example the size of estimated uplink traffic 222, for Flow1 because Flow1 corresponds to uplink and downlink traffic that serves pose portion 202 of appliance 117 shown in FIG. 2. However, configuration 304 may not include configuration information that indicates to user equipment 115 to estimate buffer status information for traffic flows that correspond to peripheral portions 204 or 206 of appliance 117.

Figure 3B:
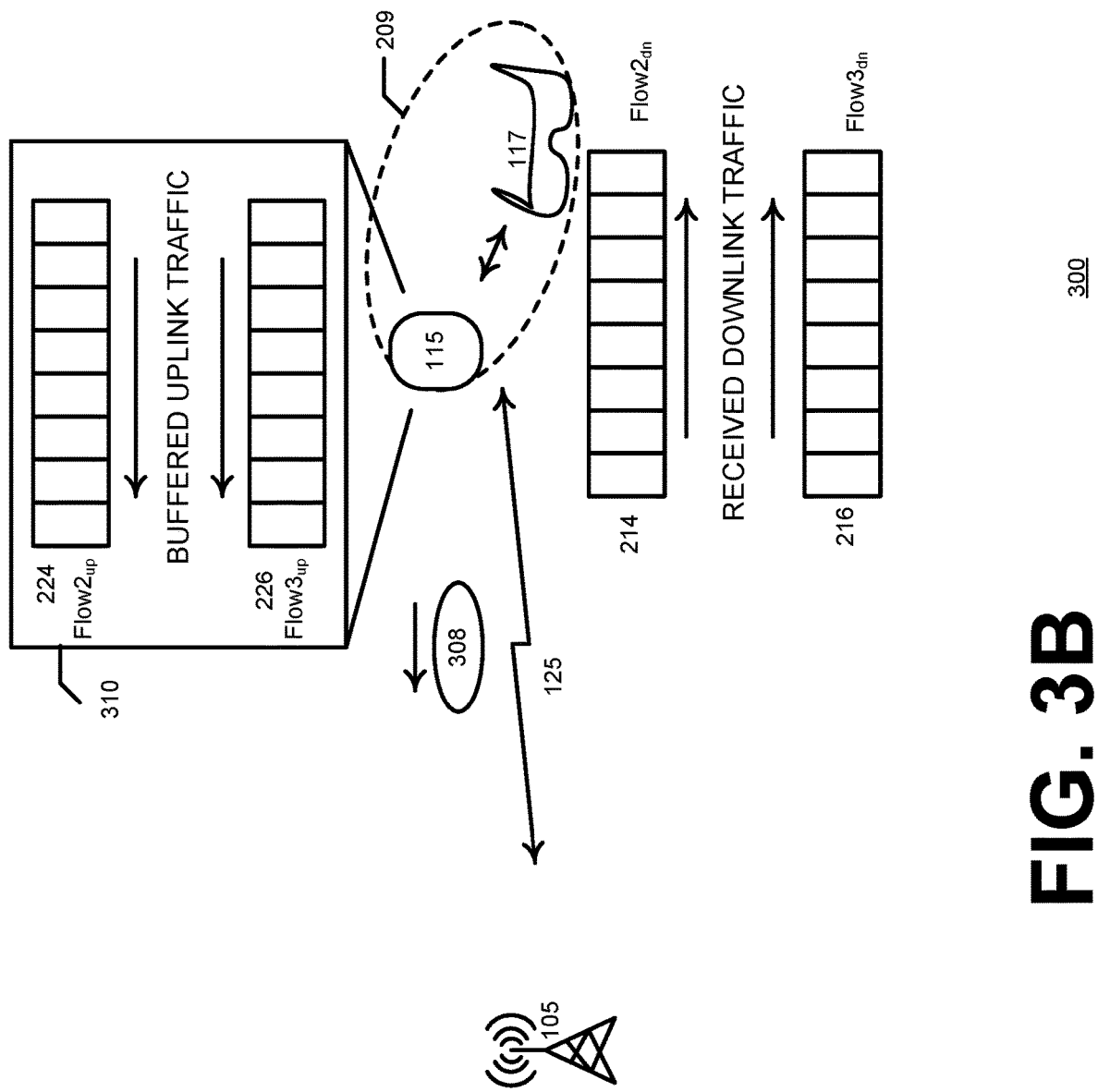
FIG. 3B illustrates an example user equipment managing uplink traffic that corresponds to downlink traffic for a moderate or low QoS traffic flow.

Therefore, as shown in FIG. 3B, instead of estimating a buffer status report for Flow2 and for Flow3, user equipment may generate uplink traffic flow portions 224 and 226 and generate a buffer status report that indicates traffic buffered in buffer 310 as shown in FIG. 3B. As shown in FIG. 3B, uplink traffic portions 224 and 226 are shown depicted in solid lines to indicate that the traffic flow portions comprise traffic that has already been generated and buffered in 310 as compared to uplink traffic flow portion 222 being shown in broken lines in FIG. 3A indicating that uplink traffic portion 222 has not been generated or buffered in buffer 310 when estimated buffer status report 306 is generated and transmitted to RAN 105. Thus, in an embodiment, for more important traffic of Flow1, (e.g., if Flow1 facilitates traffic relative to important pose portion 202), estimated buffer status report 306 shown in FIG. 3A reduces latency for traffic of Flow1, whereas for Flow2 and for Flow 3, the traffic of which may not be as important, or require as stringent of a latency, as the traffic of Flow1, user equipment 115 may use a conventional approach of determining and transmitting a buffer status report after uplink traffic portions 224 and 226 have been generated and placed into buffer 310 of user equipment 115, since Flow2 and Flow3 may not be associated (e.g., via message 302) with as low a latency target as Flow1. In another embodiment, as described in more detail in reference to FIG. 5, instead of generating and transmitting an estimated buffer status report, UE 115 may transmit uplink traffic, for example a portion of Flow1$_{up}$, via an uplink resource configured by configuration 304 without transmitting a buffer status report, whether an estimated buffer status report or a buffer status report based on traffic already generated and buffered in buffer 310.

Figure 4A:
FIG. 4A illustrates example contents of an application-type indication message.

Turning now to FIG. 4A, the figure illustrates example embodiment contents of application-type indication message 302. An XR-capable user equipment running an XR application, such as application 209, shown in other figures herein, transmits an XR-specific capability indication, via a message 302 to indicate to serving RAN nodes application information corresponding to application 209. Message 302 may indicate 5G quality of service class identifiers ("QC") 303A-303n, corresponding to traffic flows that are serving, or being used by, the XR application. QCIs 303 in message 302 may indicate quality-of-service profiles in terms of performance targets (e.g., capacity or packet delay budget) corresponding to traffic flows. A message 302 can be included as additional information elements during radio resource control (RRC) connection establishment signaling transmitted from user equipment devices. Based on indications received in message 302, a RAN becomes aware of QoS targets of a device's and XR applications and traffic flows corresponding thereto, and accordingly, the RAN can efficiently schedule resources for the traffic flows corresponding the QCIs in message 302.

Figure 4B:
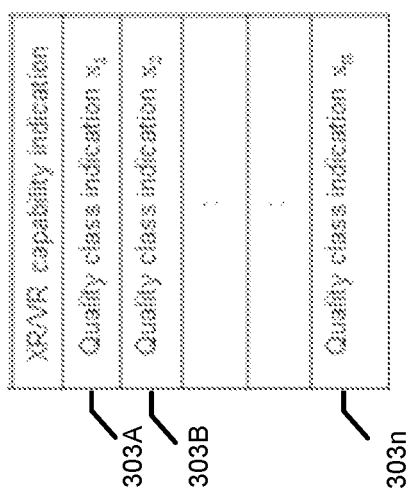
FIG. 4B illustrates example contents of an application-specific search space configuration.

Turning now to FIG. 4B, the figure illustrates example contents of a joint downlink-uplink scheduling configuration 304. In response to a message 302 received from a user equipment, a network RAN may transmit to a user equipment a search space indication message 305 indicative of an application-specific search space 307, that may be used by the user equipment to obtain configuration 304. Message 305 may comprise configuration information to configure the user equipment with a XR/application-specific control channel design search space 307, as shown by FIG. 4B. A control channel space message 305 may comprise a new downlink control channel information (DCI), disclosed herein, for XR traffic. Configuration information contained in message 305 may comprise the following new information elements that may define search space 307: A frequency resource information of the XR-specific control channel; a timing information including starting time, time length, and periodicity of the XR-specific control channel search space; an XR-specific scrambling code for devices to use to monitor and attempt decoding the XR-specific control channel; or a one or more flow IDs or QCI IDs for which the XR-specific control channel should be monitored for scheduling grant information in both downlink and uplink directions. A separate search space 307 may be indicated in message 305 for traffic flows corresponding to flow identifiers 308 to facilitate applying embodiments disclosed herein for critical traffic directed to a given application that has high performance requirements, whereas conventional scheduling procedures may be applied to less critical flows. For example, XR I-frames have more impact on an end user's experience than XR P-frames, and accordingly, a user may feel dizziness, due to degraded streaming quality resulting from frozen parts of the important XR streaming. Thus, overhead for jointly scheduling downlink and uplink resources may only be incurred for more critical vital XR traffic.

Figure 4C:
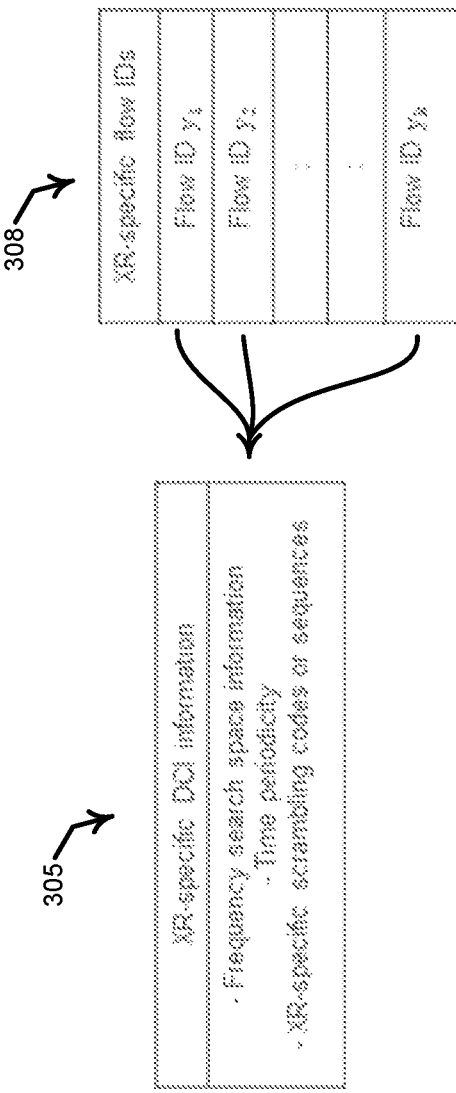
FIG. 4C illustrates example contents of uplink control information message comprising expected buffer status information.

Turning now to FIG. 4C the figure illustrates example contents of an uplink control information message that may comprise expected buffer status information that may be transmitted in an estimated buffer status report transmitted in message 306. A user equipment device configured for joint downlink and uplink XR resource scheduling may transmit an estimated buffer status report as an uplink control information ("UCI") message. As shown in FIG. 4C, an estimated buffer status report UCI may comprise standard/conventional uplink control channel information as well as information elements disclosed herein that may comprise one or more indications of an expected XR-application-specific buffer size of yet to be buffered uplink traffic corresponding to previously received downlink traffic. As described herein, use of an estimated buffer status report may be based on the premise that for each downlink traffic portion received by an XR application there will likely be a corresponding uplink traffic portion, having a size that corresponds to a size of the linked downlink traffic portion, that may comprise an update for control, location, or orientation information that will need to be transmitted as the uplink traffic portion with minimal delay, especially if the traffic flow corresponds to a pose portion of an XR appliance. The time of availability of uplink traffic and corresponding traffic size may depend on a particular XR application. Accordingly, a user equipment device running an XR application may, in real-time, indicate to a serving RAN an estimated application-specific uplink traffic size for traffic that is not yet in an uplink buffer of the user equipment, but that is expected, by the XR application, to be in the buffer soon. A message 306 may also comprise an application-specific, or flow specific, latency criterion that defines an acceptable delay between a downlink traffic portion and a corresponding uplink traffic portion. An indication of a latency criterion may comprise a quantized value retrieved from a configured codebook of buffer size and latency ranges, or a latency criterion may be reported as an absolute/discrete/determined value. In an embodiment, transmitting of a message 306 that comprises estimated buffer status report information for a traffic flow may be triggered only when a buffer size criterion or a latency criterion associated with the flow (e.g., a buffer size threshold or a latency threshold) is/are violated (e.g., such a triggering, or a determination, that may be made at act 735 described in reference to FIG. 7). The buffer size criterion/threshold or latency criterion/threshold may be configured from a serving RAN node during RRC connections establishment.

Turning now to FIG. 4D, the figure illustrates an example joint downlink-uplink scheduling configuration 304.

Figure 5:
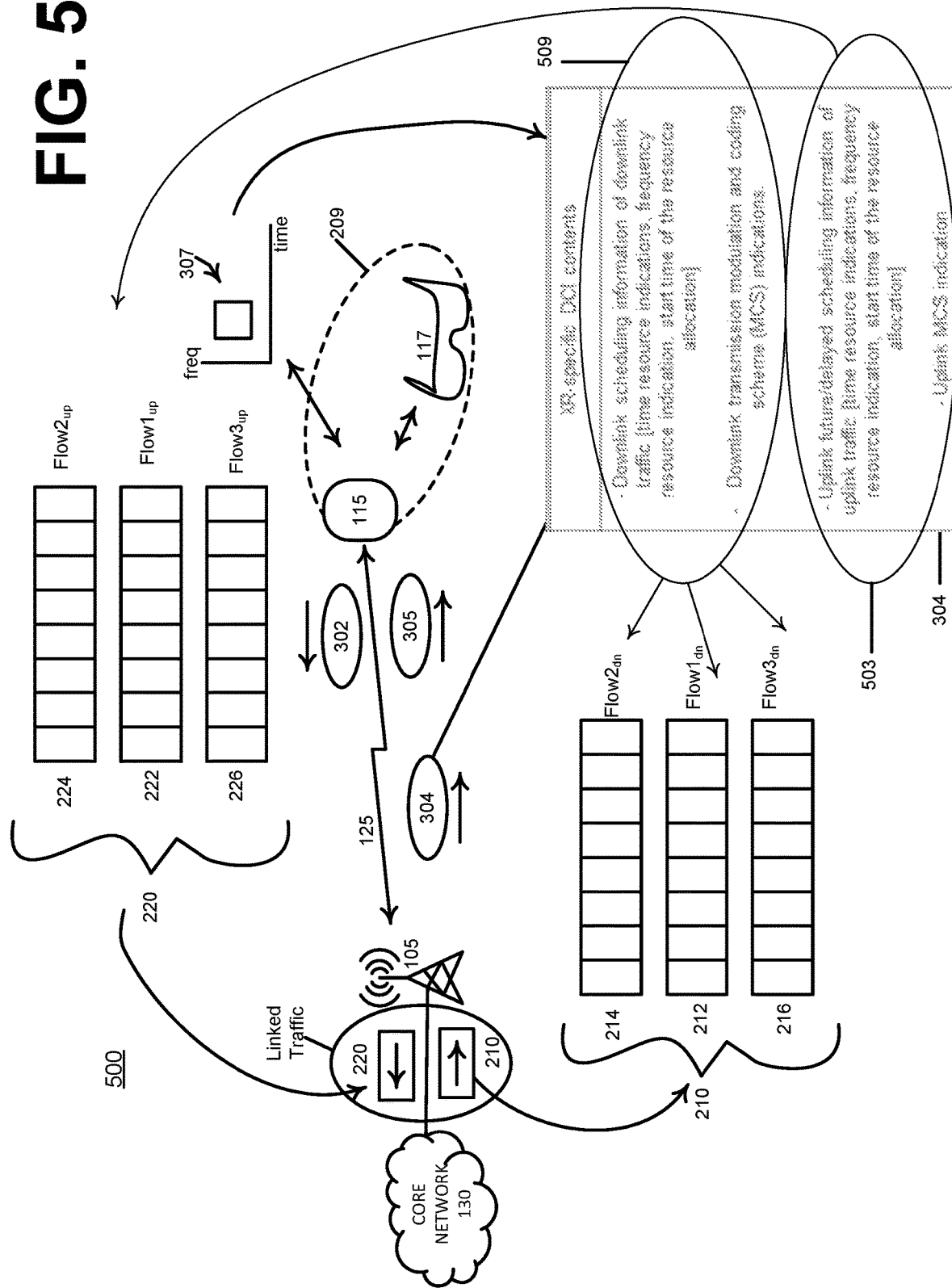
FIG. 5 illustrates an example user equipment managing linked downlink and uplink traffic using an application-specific downlink control channel configuration.

Turning now to FIG. 5, the figure illustrates an example embodiment with user equipment 115 in environment 500 managing linked downlink and uplink traffic using application-specific downlink control channel configuration information indicated in search space 307, an indication of which is received in message 305. RAN 105 transmits configuration 304, which may comprise a DCI message, received according to configured, application-specific (e.g., XR-specific) control channel search space 307. Configuration 304 may comprise indications of: Downlink scheduling timing and frequency resource information; downlink transmission configurations in terms of a modulation and coding scheme ("MCS"); uplink scheduling timing and frequency resource information; or uplink transmission configurations in terms of an MCS.

RAN 105 may use configuration information contained in configuration 304 to dynamically adjust uplink resource scheduling information based on application-specific traffic size and timing information corresponding to traffic received from core network 130 directed to UE 115. Thus, by scheduling uplink resources for uplink traffic 220 of a traffic flow and downlink traffic 210 of the same traffic flow (e.g., the uplink traffic flow and the downlink traffic flow may be thought of as linked), RAN 105 may minimize overscheduling or under scheduling of resource sets, and avoid, reduce, or minimize, resource waste, or avoid scheduling of insufficient uplink resources, which could lead to performance degradation of an application being served by the linked traffic flow. UE 115 may attempt decoding XR-specific search space 307 using a configured (e.g., configured via message 305) XR-specific scrambling code, and extract the joint downlink and uplink scheduling information corresponding to critical XR traffic flows, thus minimizing delay that may otherwise result from scheduling downlink and uplink resource scheduling independently or separately.

As shown in FIG. 5, joint downlink-uplink scheduling configuration 304 may comprise downlink scheduling and transmission information 509 corresponding to $Flow1_{dn}$, $Flow2_{dn}$, or $Flow3_{dn}$. It will be appreciated that downlink scheduling and transmission information 509 may be used for all of multiple flows of traffic 210, fewer than all of traffic flows of traffic 210, or may be used for only one of traffic flows of traffic 210. For example, downlink scheduling and transmission information 509 may be used only for $Flow1_{dn}$, leaving $Flow2_{dn}$ and $Flow3_{dn}$ to be managed by application 209 according to conventional downlink monitoring and decoding techniques. Uplink scheduling and transmission information 503 may be linked in configuration 507 with downlink information 509, and may apply to uplink traffic portions of $Flow1_{up}$, $Flow2_{up}$, or $Flow3_{up}$. Similar to use of downlink scheduling and transmission information 509 to decode downlink traffic flows of traffic 210, uplink information 503 may be used by application 209 on the transmitting of all of, less than all of, or only one of $Flow1_{up}$, $Flow2_{up}$, or $Flow3_{up}$. It will be appreciated that if downlink scheduling and transmission information 509 applies to only one traffic flow, for example Flow1, then uplink scheduling and transmission information 503 may also only apply to one uplink traffic portion of traffic 220, for example $Flow1_{up}$. The assigning by RAN 105 of uplink information 503 and linked downlink information 509 to one or more uplink flows or downlink flows, respectively, may be based on QCIs included in message 302 transmitted from UE 115 to the RAN.

Figure 6:
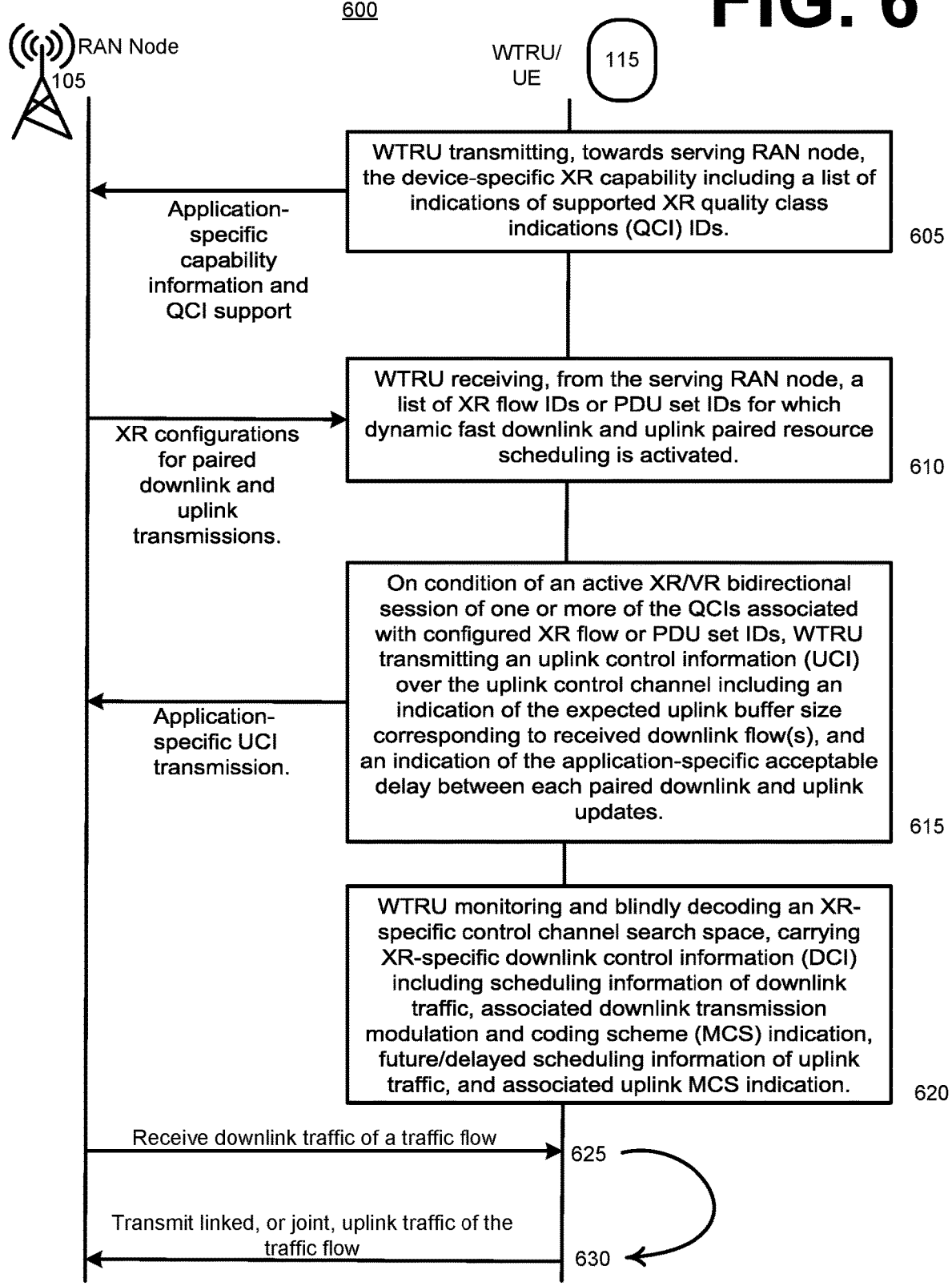
FIG. 6 illustrates a timing diagram of an example method to dynamically manage scheduling of linked joint uplink and downlink traffic.

Turning now to FIG. 6, the figure illustrates a timing diagram of an embodiment method 600. At act 605, UE/WTRU 115 transmits, to serving RAN node 105 device-specific, or application-specific (e.g., XR-specific) capabilities, including a list of indications of supported XR quality class indications ("QCI") corresponding to traffic flows being supported by an application running on the UE. At act 610, UE/WTRU 115 receives from serving RAN node 105, a list of XR flow identifiers, packet data unit identifiers ("PDU") set identifiers for which dynamic fast, joint downlink and uplink paired resource scheduling has been activated by RAN 105. At act 615, on condition of an active bidirectional session (e.g., an XR/VR session for an XR/VR application running at UE 115) corresponding to one or more of the QCIs, transmitted at act 605 and corresponding to an XR flow or PDU set identifier configured at act 610, UE/WTRU 115 may transmit an uplink control information message over an uplink control channel, which may have been configured via information received at act 610. The uplink control information transmitted at act 615 may comprise an indication of an expected uplink buffer size corresponding to a received downlink traffic flow. The uplink control information transmitted at act 615 may comprise an indication of an application-specific acceptable delay (e.g., a latency criterion) between paired downlink and uplink traffic portions, which may comprise XR updates corresponding to a pose position of a smart glass appliance. At act 620, UE/WTRU 115 monitors and blindly decodes an XR-specific control channel search space, which may have been included in information transmitted from RAN 105 to UE 115 at act 610. The XR-specific search space decoded at act 620 may comprise indication(s) of XR-specific downlink control information including scheduling information of downlink traffic, indication of associated downlink transmission modulation and coding schema, future/delayed resource scheduling information of uplink traffic linked to the downlink traffic, and associated uplink MCS information. At act 625, UE/WTRU 115 may receive and decode downlink traffic according to resource information configured by information received at act 610 (e.g., configuration 304) and the U/WTRU may transmit at act 630 application-specific uplink traffic, corresponding to the downlink traffic received and decoded at act 625, using a scheduled-for-future use uplink resource which may have been received at act 610 (e.g., also in configuration 304).

Figure 7:
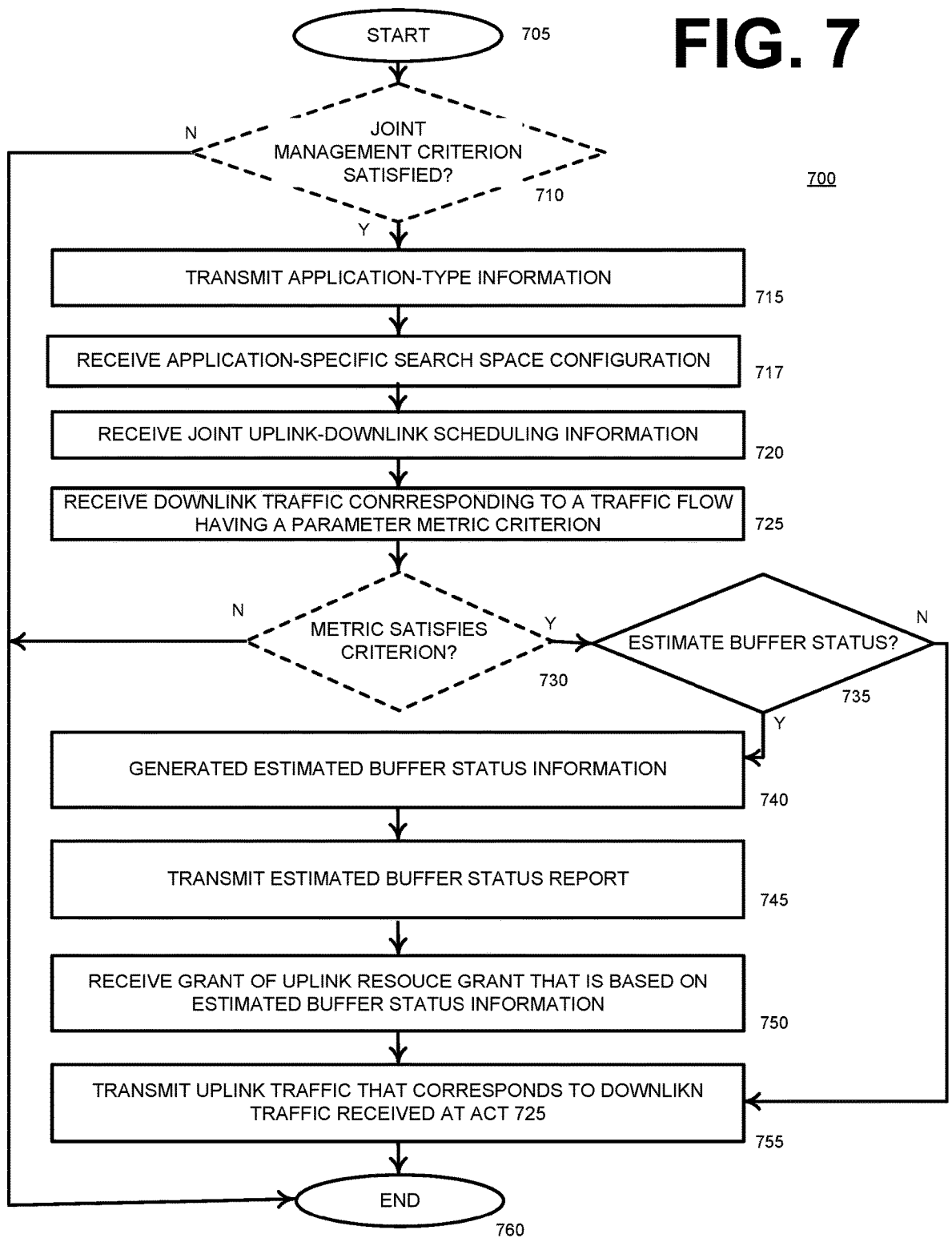
FIG. 7 illustrates a flow diagram of an example method to dynamically manage scheduling of linked joint uplink and downlink traffic.

Turning now to FIG. 7, the figure illustrates a flow diagram of an example embodiment method 700 to manage linked uplink and downlink traffic flows. Method 700 begins at act 705. At act 710, a user equipment determines whether to transmit an application-type information message to request a joint uplink-downlink configuration for an application that the user equipment may be executing or that the user equipment may be about to execute. A determination whether to request a joint uplink-downlink configuration may be based on an application type, or for an application already running/executing on the user equipment, the determination made at act 710 may be based on a joint management criterion being satisfied. For example, if a user equipment is already running an application but a traffic flow corresponding to the application exhibits performance degradation, for example a latency associated with the traffic flow exceeds a configured threshold, the user equipment may determine at act 710 to transmit an application type information message and advance to act 715. If the user equipment determines at act 705 that a joint management criterion has not been satisfied (e.g., a performance degradation has not been experienced for a given traffic flow at the user equipment), method 700 may advance to act 760 and end. The decision box representing act 705 in the figure is depicted with broken lines to indicate that act 705 may be optional. Thus, if a user equipment is not configured to evaluate whether a joint management criterion is satisfied before transmitting an application information message, then method 700 may begin at act 705 and advance directly to act 715.

At act 715, a user equipment may transmit an application type information message, as described elsewhere herein in reference to message 302, before or during execution by the user equipment of an application, for example an XR application. The XR application may already be running and, in an embodiment, the user equipment may not implement method 700 unless a performance degradation has been experienced with respect to a traffic flow of traffic directed to the application. Thus method 700 may be implemented dynamically, as needed or as determined, based on criteria configured in the user equipment.

After transmitting an application type information message, which may comprise QCIs corresponding to traffic flows that are directed to, and generated by, the application that is running on the user equipment, a RAN node may generate joint uplink-downlink scheduling information based on QCIs included in the application type information message transmitted at act 715. Responsive to the transmission of the application type information message transmitted at act 715, the user equipment may receive an application-specific search space configuration at act 717.

At act 720, the RAN may transmit, and the user equipment may receive, using application-specific search space configuration information received at act 717, a joint uplink-downlink scheduling configuration, such as configuration 304, described elsewhere herein, that may comprise joint uplink downlink scheduling information to be used for receiving and transmitting linked downlink and uplink traffic. The joint uplink-downlink scheduling information may comprise a configuration, an instruction, or an indication for the user equipment to estimate buffer status report information based on downlink traffic received by the user equipment. The joint uplink-downlink scheduling information may comprise uplink resources and modulation/coding schema that are linked with downlink resources and modulation/coding schema. In an embodiment, the linked uplink resources/schema and downlink resources/schema may be obtained, or determined, by the user equipment by decoding a downlink search space that that may be indicated in a configuration received at act 717, wherein the search space is to be used by the user equipment to determine the linked uplink resources/schema and downlink resources/schema configuration 304. The configuration received at act 720 may be applicable to a first traffic flow corresponding to the XR application, or another type of application requiring high performance/low latency, but the configuration received at act 720 may not be applicable to a second traffic flow corresponding to the application that may be associated with a lower quality/performance target/criterion.

At act 725, the user equipment receives downlink traffic corresponding to a traffic flow directed to the application, which traffic flow may be associated with a parameter metric criterion, for example, a latency criterion corresponding to the traffic flow. At act 730, the user equipment may determine whether a determined parameter metric, for example, a measured or determined latency value corresponding to the traffic flow, satisfies the parameter metric criterion. If the determined metric, for example a determined latency value, does not satisfy the criterion, (e.g., the measured or determined latency value is less than a latency criterion), method 700 advances to act 760 and ends. It will be appreciated that act 730 may be optional and thus is depicted in FIG. 7 with broken lines. Accordingly, if the user equipment is not configured to perform act 730, or if a determination is made at act 730 (if the user equipment is configured to perform act 730) that a determined metric satisfies a corresponding criterion, method 700 advances to act 735. A user equipment may not be configured to perform act 730 if the user equipment is configured to always transmit uplink traffic that corresponds to downlink traffic received at act 725 according to uplink instructions, or uplink resources, of a joint uplink-downlink scheduling information configuration received at act 720.

At act 735, the user equipment may be configured to estimate a buffer status based on the downlink traffic received at act 725. Although joint uplink-downlink scheduling information received in a configuration at act 720 may include linked uplink resources/schema and downlink resources/schema, the configuration received at act 720 may nevertheless configure the user equipment to estimate a buffer status, based on downlink traffic received at act 725, for corresponding uplink traffic (e.g., corresponding to the downlink traffic) that has not been generated or stored into a buffer of the user equipment. If a determination is made at act 735 that an estimated buffer status report is to be generated, method 700 advances to act 740 and the user equipment generates estimated buffer status information that may indicate an expected amount of uplink traffic that will be transmitted by the user equipment responsive to, or corresponding to, the downlink traffic that was received at act 725.

At act 745, the user equipment transmits the estimated buffer status information generated at act 740 as an estimated buffer status report to a serving RAN node. The estimated buffer status report may be transmitted according to an uplink resource indicated in a configuration received at act 720, or according to a resource indicated by a search space indicated in a configuration received at act 720. After receiving the estimated buffer status report that was transmitted at act 745, the RAN node may determine, or schedule, uplink resources to be granted to the user equipment to transmit uplink traffic corresponding to the estimated buffer status information that was determined at act 740. The RAN node may transmit the determined uplink resource as an uplink resource grant, which the user equipment may receive at act 750. After receiving the uplink resource grant transmitted act 750, the user equipment may transmit, at act 755, uplink traffic that corresponds to the downlink traffic that was received at act 725. Method 700 advances to act 760 and ends.

Returning to description of act 735, if a determination is made, based on a configuration, or based on another criterion, that the user equipment is not to estimate buffer status but instead is to transmit uplink traffic that may correspond to downlink traffic that was received at act 725, the user equipment may advance to act 755 and transmit uplink traffic that corresponds to the downlink traffic that was received at act 725 according to uplink resources or modulation schema indicated by joint uplink-downlink configuration information received at act 720.

Accordingly, using configuration information received at act 720, a user equipment may not need to immediately generate uplink traffic in response to received downlink traffic, transmit a buffer status report corresponding to the generated uplink traffic, wait to receive an uplink grant to transmit uplink traffic that corresponds to the already received downlink traffic, and then transmit the actual uplink traffic. Instead, in an embodiment, in response to receiving downlink traffic for a traffic flow that is associated with a high quality of service, the user equipment may estimate an uplink buffer status and request an uplink resource grant based thereon before the user equipment has generated uplink traffic. Thus, implementing method 700 may reduce latency associated with waiting to request an uplink resource based on a buffer status report that indicates to a RAN node uplink traffic that is already buffered by the user equipment for uplink transmission. In an embodiment, the user equipment may use uplink resources and schema, based on downlink traffic received at act 725 according to an indication in configuration information received at act 720, to transmit uplink traffic that corresponds to the downlink traffic received at act 725, without engaging in a process with the RAN node of obtaining uplink resources after actual uplink traffic has been generated.

Figure 8:
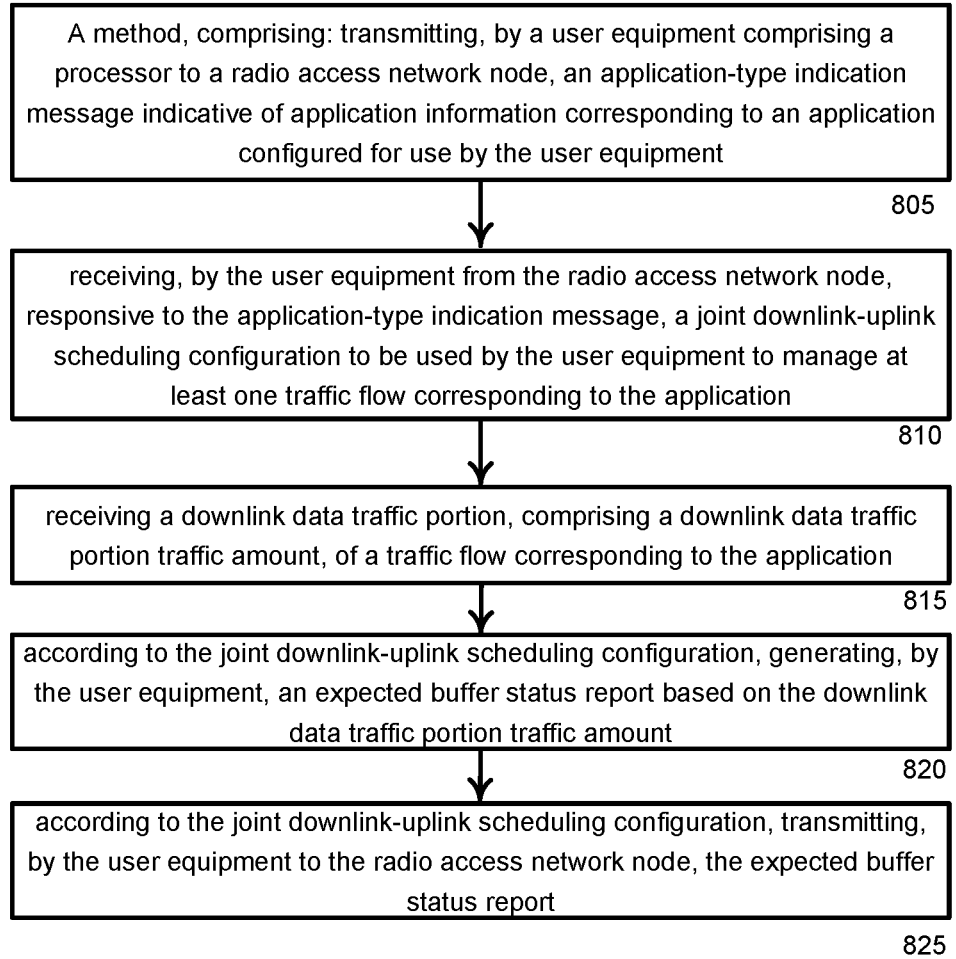
FIG. 8 illustrates a block diagram of an example method.

Turning now to FIG. 8, the figure illustrates an example embodiment method 800 comprising at block 805, transmitting, by a user equipment comprising a processor to a radio access network node, an application-type indication message indicative of application information corresponding to an application configured for use by the user equipment; at block 810 receiving, by the user equipment from the radio access network node, responsive to the application-type indication message, a joint downlink-uplink scheduling configuration to be used by the user equipment to manage at least one traffic flow corresponding to the application; at block 815 receiving a downlink data traffic portion, comprising a downlink data traffic portion traffic amount, of a traffic flow corresponding to the application; at block 820 according to the joint downlink-uplink scheduling configuration, generating, by the user equipment, an expected buffer status report based on the downlink data traffic portion traffic amount; and at block 825 according to the joint downlink-uplink scheduling configuration, transmitting, by the user equipment to the radio access network node, the expected buffer status report.

Figure 9:
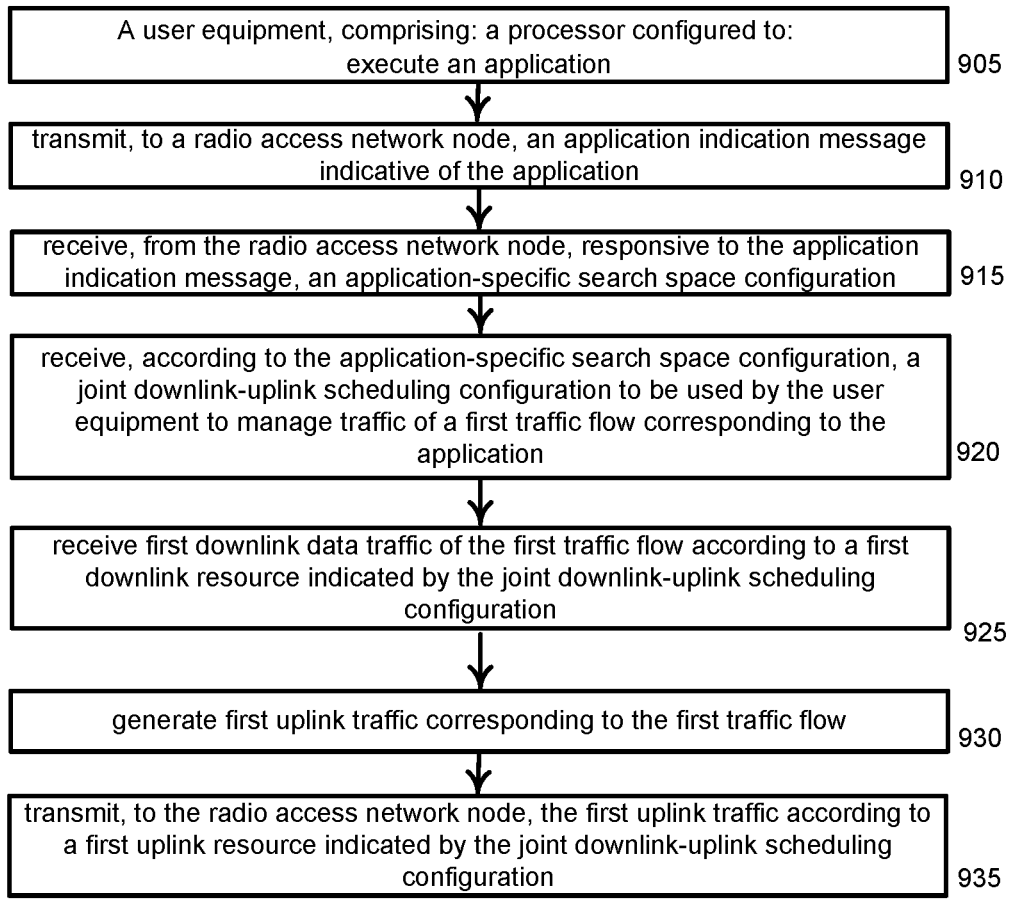
FIG. 9 illustrates a block diagram of an example user equipment.

Turning now to FIG. 9, the figure illustrates an example user equipment 900, comprising at block 905 a processor configured to execute an application; at block 910 transmit, to a radio access network node, an application indication message indicative of the application; at block 915 receive, from the radio access network node, responsive to the application indication message, an application-specific search space configuration; at block 920 receive, according to the application-specific search space configuration, a joint downlink-uplink scheduling configuration to be used by the user equipment to manage traffic of a first traffic flow corresponding to the application; at block 925 receive first downlink data traffic of the first traffic flow according to a first downlink resource indicated by the joint downlink-uplink scheduling configuration; at block 930 generate first uplink traffic corresponding to the first traffic flow; and at block 935 transmit, to the radio access network node, the first uplink traffic according to a first uplink resource indicated by the joint downlink-uplink scheduling configuration.

Figure 10:
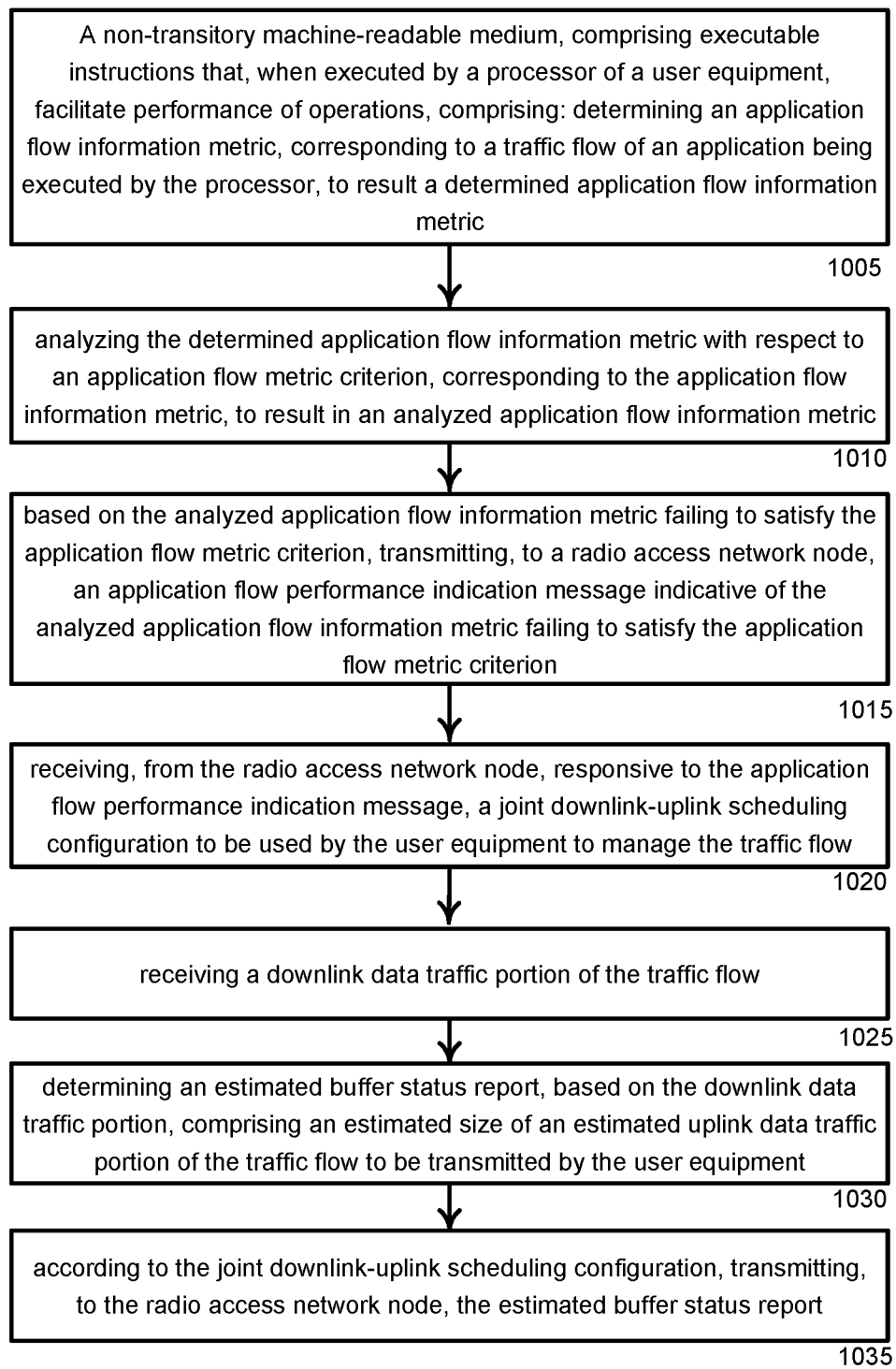
FIG. 10 illustrates a block diagram of an example non-transitory machine-readable medium.

Turning now to FIG. 10, the figure illustrates a non-transitory machine-readable medium 1000 comprising at block 1005 a non-transitory machine-readable medium, comprising executable instructions that, when executed by a processor of a user equipment, facilitate performance of operations, comprising: determining an application flow information metric, corresponding to a traffic flow of an application being executed by the processor, to result a determined application flow information metric; at block 1010 analyzing the determined application flow information metric with respect to an application flow metric criterion, corresponding to the application flow information metric, to result in an analyzed application flow information metric; at block 1015 based on the analyzed application flow information metric failing to satisfy the application flow metric criterion, transmitting, to a radio access network node, an application flow performance indication message indicative of the analyzed application flow information metric failing to satisfy the application flow metric criterion; at block 1020 receiving, from the radio access network node, responsive to the application flow performance indication message, a joint downlink-uplink scheduling configuration to be used by the user equipment to manage the traffic flow; at block 1025 receiving a downlink data traffic portion of the traffic flow, at block 1030 determining an estimated buffer status report, based on the downlink data traffic portion, comprising an estimated size of an estimated uplink data traffic portion of the traffic flow to be transmitted by the user equipment; and at block 1035 according to the joint downlink-uplink scheduling configuration, transmitting, to the radio access network node, the estimated buffer status report.

Figure 11:
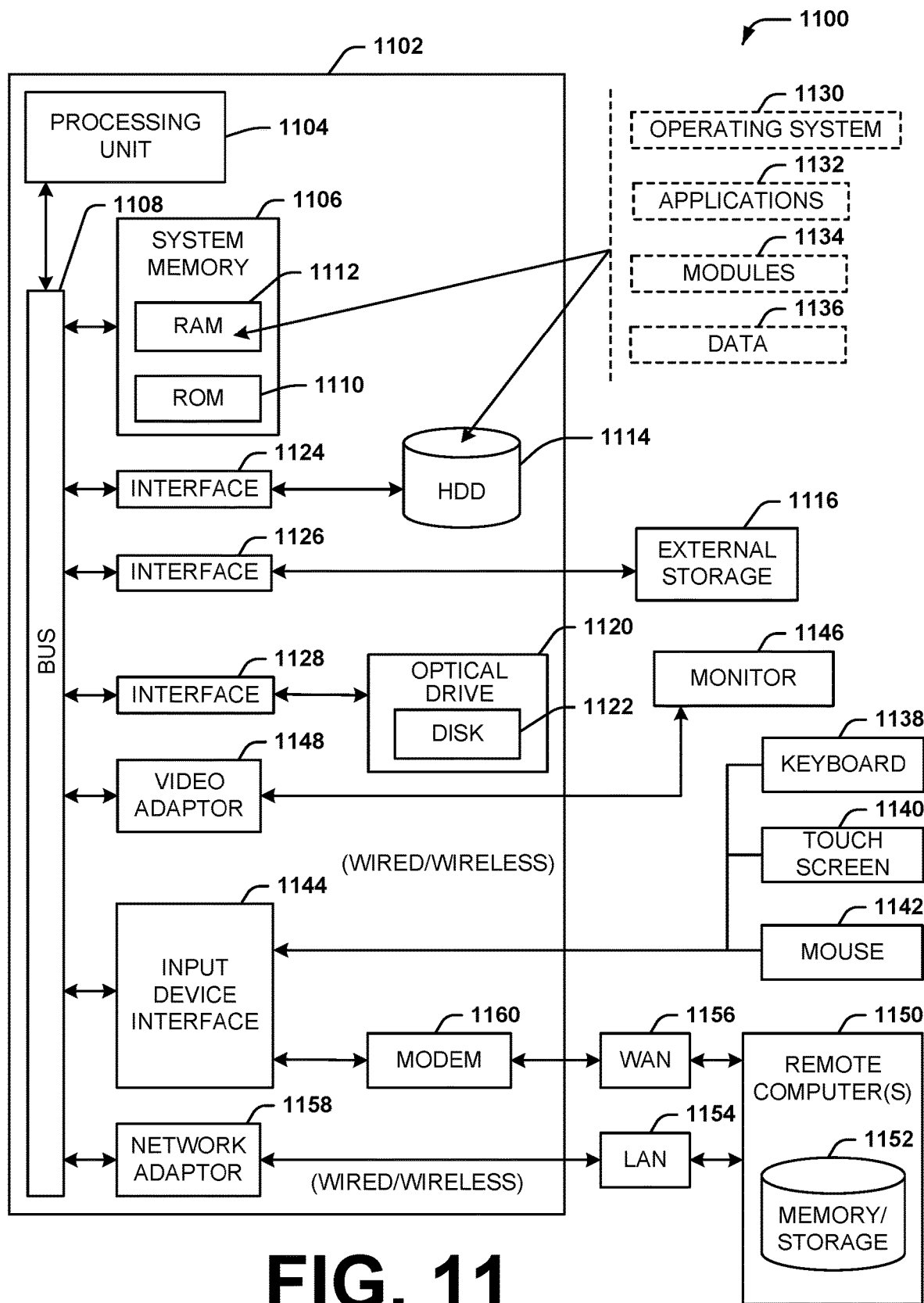
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
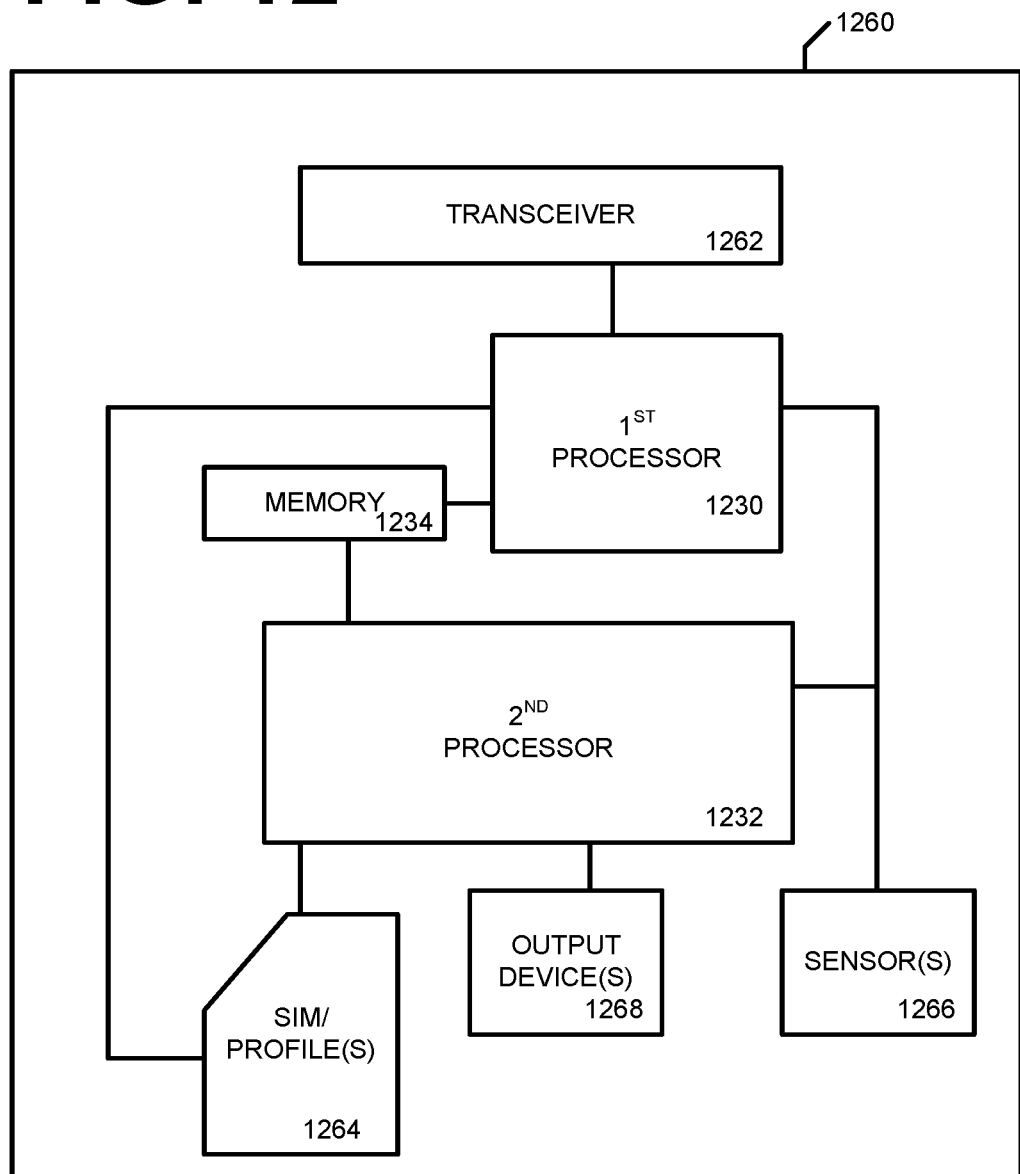
FIG. 12 illustrates a block diagram of an example wireless UE.

Turning to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, a tracking device, remote sensing devices, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 121264 that second processor 1232 may request, thus eliminating the use of the first processor acting as a 'go-between' when the second processor uses information from the SIM in performing its functions and in executing applications. First processor 1230, which may be a modem processor or a baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |

TABLE 1-continued

| Term | Definition |
|---|---|
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| QCI | QoS Class Identifiers |
| BSR | Buffer status report |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   transmitting, by a user equipment comprising a processor to a radio access network node, an application-type indication message indicative of application information corresponding to an application configured for use by the user equipment;
   receiving, by the user equipment from the radio access network node, responsive to the application-type indication message, a joint downlink-uplink scheduling configuration to be used by the user equipment to manage at least one traffic flow corresponding to the application;
   receiving a downlink data traffic portion, comprising a downlink data traffic portion traffic amount, of a traffic flow corresponding to the application;
   according to the joint downlink-uplink scheduling configuration, generating, by the user equipment, an expected buffer status report based on the downlink data traffic portion traffic amount; and
   according to the joint downlink-uplink scheduling configuration, transmitting, by the user equipment to the radio access network node, the expected buffer status report,
   wherein the expected buffer status report is transmitted before an uplink data traffic portion, to be transmitted and corresponding to the downlink data traffic portion, is in a buffer of the user equipment.

2. The method of claim 1, wherein the application information comprises an application target quality-of-service metric to be used by the radio access network node to assign an application service class to the traffic flow.

3. The method of claim 1, wherein the joint downlink-uplink scheduling configuration comprises at least one traffic flow identifier corresponding to the at least one traffic flow.

4. The method of claim 1, wherein the application-type indication message is transmitted as an uplink control channel information message.

5. The method of claim 1, wherein the application-type indication message comprises an expected buffer status size corresponding to an expected uplink data traffic portion expected to be transmitted by the user equipment to the radio access network node following receiving of a future downlink data traffic portion directed to the application.

6. The method of claim 1, wherein the application information comprises an application latency criterion indication indicative of an acceptable delay, corresponding to the traffic flow, between receiving of a future downlink data traffic portion and transmitting of an uplink control indication indicative of uplink traffic, corresponding to the future downlink data traffic portion, to be transmitted by the user equipment to the radio access network node.

7. The method of claim 1, wherein the application-type indication message is configured to be transmitted by the user equipment upon a configured latency criterion being satisfied.

8. The method of claim 1, further comprising:
   according to the joint downlink-uplink scheduling configuration, transmitting, by the user equipment to the radio access network node, the uplink data traffic portion corresponding to the downlink data traffic portion.

9. The method of claim 1, further comprising: receiving, by the user equipment, an application-specific downlink search space indication indicative of an application-specific downlink search space to be used by the user equipment to manage traffic corresponding to the application.

10. The method of claim 9, wherein the application-specific downlink search space indication is configured, by the radio access network node, to comprise at least one of: a downlink traffic scheduling indication indicative of a downlink search space to be used to receive downlink data traffic corresponding to the traffic flow, a downlink modulation and coding scheme indication indicative of a modulation and coding scheme to be used to receive downlink traffic corresponding of the traffic flow, an uplink traffic scheduling indication indicative of an uplink resource to be used to transmit uplink traffic corresponding to received downlink data traffic of the traffic flow, or an uplink modulation and coding scheme indication indicative of a modulation and coding scheme to be used to transmit uplink traffic corresponding to received downlink data traffic of the traffic flow.

11. The method of claim 10, further comprising:
   decoding, by the user equipment, from the application-specific downlink search space the downlink data traffic portion corresponding to the traffic flow according to at least one of the downlink traffic scheduling indication or the downlink modulation and coding scheme indication; and
   transmitting uplink traffic corresponding to the downlink data traffic portion according to at least one of the uplink traffic scheduling indication or the uplink modulation and coding scheme indication.

12. The method of claim 1, wherein the application facilitates operation of at least one virtual reality appliance with respect to the user equipment.

13. The method of claim 12, wherein the uplink data traffic portion is associated with the operation of the at least one virtual reality appliance with respect to the user equipment.

14. The method of claim 12, further comprising:
   estimating, by the user equipment, generation, via the at least one virtual reality appliance, of the uplink data traffic portion.

15. A user equipment, comprising:
   a processor configured to:
   execute an application;

transmit, to a radio access network node, an application indication message indicative of the application;

receive, from the radio access network node, responsive to the application indication message, an application-specific search space configuration;

receive, according to the application-specific search space configuration, a joint downlink-uplink scheduling configuration to be used by the user equipment to manage traffic of a first traffic flow corresponding to the application;

receive first downlink data traffic of the first traffic flow according to a first downlink resource indicated by the joint downlink-uplink scheduling configuration;

generate first uplink traffic corresponding to the first traffic flow; and transmit, to the radio access network node, the first uplink traffic according to a first uplink resource indicated by the joint downlink-uplink scheduling configuration, wherein the first uplink traffic comprises first buffer status information indicative of estimated future uplink traffic corresponding to the first downlink data traffic, and wherein the first buffer status information is transmitted as an estimated buffer status report before uplink data traffic corresponding to the first downlink data traffic has been generated by the user equipment.

16. The user equipment of claim 15, the processor further configured to:

receive, from the radio access network node, responsive to the application indication message, a downlink scheduling indication indicative of a second downlink resource to be used by the user equipment to receive second downlink data traffic of a second traffic flow corresponding to the application;

receive, from the radio access network node, second downlink data traffic of the second traffic flow according to the second downlink resource;

receive, from the radio access network node, a second uplink resource indication indicative of a second uplink resource to be used to transmit a buffer status report indicative of uplink traffic to be generated corresponding to the second downlink data traffic;

generate second uplink data traffic corresponding to the second downlink data traffic;

generate second buffer status information indicative of the second uplink data traffic; and transmit, to the radio access network node, a second buffer status report, comprising the second buffer status information, after the second downlink data traffic has been generated.

17. The user equipment of claim 16, wherein the first traffic flow has a first quality of service requirement, wherein the second traffic flow has a second quality of service requirement, and wherein the first quality of service requirement is higher than the second quality of service requirement.

18. The user equipment of claim 15, wherein the first uplink traffic comprises the uplink data traffic corresponding to the first downlink data traffic.

19. A non-transitory machine-readable medium, comprising executable instructions that, when executed by a processor of a user equipment, facilitate performance of operations, comprising:

determining an application flow information metric, corresponding to a traffic flow of an application being executed by the processor, to result a determined application flow information metric;

analyzing the determined application flow information metric with respect to an application flow metric criterion, corresponding to the application flow information metric, to result in an analyzed application flow information metric;

based on the analyzed application flow information metric failing to satisfy the application flow metric criterion, transmitting, to a radio access network node, an application flow performance indication message indicative of the analyzed application flow information metric failing to satisfy the application flow metric criterion;

receiving, from the radio access network node, responsive to the application flow performance indication message, a joint downlink-uplink scheduling configuration to be used by the user equipment to manage the traffic flow;

receiving a downlink data traffic portion of the traffic flow;

determining an estimated buffer status report, based on the downlink data traffic portion, comprising an estimated size of an estimated uplink data traffic portion of the traffic flow to be transmitted by the user equipment; and according to the joint downlink-uplink scheduling configuration, transmitting, to the radio access network node, the estimated buffer status report, wherein the estimated buffer status report is transmitted before an uplink data traffic portion, to be transmitted and corresponding to the downlink data traffic portion, is in a buffer to which the estimated buffer status report corresponds.

20. The non-transitory machine-readable medium of claim 19, wherein the determined application flow information metric is a latency corresponding to the traffic flow.

* * * * *